(12) United States Patent
Song

(10) Patent No.: US 6,791,960 B1
(45) Date of Patent: *Sep. 14, 2004

(54) PILOT SIGNALS FOR SYNCHRONIZATION AND/OR CHANNEL ESTIMATION

(75) Inventor: Young-Joon Song, Kyonggi-do (KR)

(73) Assignee: LG Information and Communications, Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 09/373,703

(22) Filed: Aug. 13, 1999

(30) Foreign Application Priority Data

| Mar. 15, 1999 | (KR) | 1999-8630 |
|---|---|---|
| Apr. 12, 1999 | (KR) | 1999-12856 |
| Apr. 12, 1999 | (KR) | 1999-12857 |
| Apr. 30, 1999 | (KR) | 1999-15722 |
| May 28, 1999 | (KR) | 1999-19505 |
| May 28, 1999 | (KR) | 1999-19506 |
| May 29, 1999 | (KR) | 1999-19610 |
| Jun. 19, 1999 | (KR) | 1999-23140 |
| Jun. 19, 1999 | (KR) | 1999-23141 |
| Jun. 22, 1999 | (KR) | 1999-23568 |
| Jun. 24, 1999 | (KR) | 1999-23937 |
| Jul. 2, 1999 | (KR) | 1999-26689 |

(51) Int. Cl.[7] .............................. H04B 7/216; H04J 3/06
(52) U.S. Cl. .................... 370/335; 370/342; 370/503
(58) Field of Search ................. 370/350, 503, 370/509, 512, 514, 515, 335, 342, 252; 375/149, 150, 369

(56) References Cited

U.S. PATENT DOCUMENTS

| 3,461,451 A | 8/1969 | Gutleber ................. 340/348 |
| 3,728,533 A | 4/1973 | Matthews ................ 708/212 |
| 5,022,047 A | 6/1991 | Dixon et al. ............ 375/142 |
| 5,504,781 A | 4/1996 | Wolf ..................... 375/242 |
| 5,533,010 A | 7/1996 | Tanaka ................... 370/342 |
| 5,680,414 A * | 10/1997 | Durrant et al. .......... 375/150 |
| 5,719,873 A | 2/1998 | Yamashita et al. ....... 370/513 |
| 5,727,018 A * | 3/1998 | Wolf et al. ............. 375/149 |
| 5,737,326 A | 4/1998 | I et al. ................. 370/335 |
| 5,774,462 A | 6/1998 | Ishikawa et al. ......... 370/350 |
| 5,812,593 A | 9/1998 | Kaku ..................... 375/150 |
| 5,889,768 A | 3/1999 | Storm et al. ............ 370/320 |

(List continued on next page.)

FOREIGN PATENT DOCUMENTS

| EP | 0 886 385 A2 | 12/1998 |
| JP | 03032241 A | 2/1991 |
| JP | 04-142823 | 5/1992 |
| JP | 09051289 A | 2/1997 |
| JP | 10-505477 | 5/1998 |
| JP | 10327126 A | 12/1998 |
| WO | WO 95/34154 A2 | 12/1995 |
| WO | WO 95/34157 | 12/1995 |
| WO | WO 97/02666 | 1/1997 |
| WO | WO 00/00912 A1 | 1/1999 |
| WO | WO 00/50902 A2 | 2/2000 |

OTHER PUBLICATIONS

Song, "Pilot Signals for Synchronization and/or Channel Estimation", Aug. 18, 1999, U.S. patent application # 09/376373.*

(List continued on next page.)

*Primary Examiner*—Chau Nguyen
*Assistant Examiner*—Soon-Dong Hyun
(74) *Attorney, Agent, or Firm*—Fleshner & Kim, LLP

(57) ABSTRACT

The frame synchronization words of the preferred embodiment are especially suitable for frame synchronization confirmation. By adding the autocorrelation functions of shaded frame synchronization words, double maximum values equal in magnitude and opposite polarity at zero and middle shifts are obtained. This property can be used to slot-by-slot and double-check frame synchronization timing and reduce the synchronization search time. Further, the present invention allows a simpler construction of a correlator circuit for a receiver.

33 Claims, 33 Drawing Sheets

U.S. PATENT DOCUMENTS

| | | | |
|---|---|---|---|
| 5,898,665 A | | 4/1999 | Sawahashi et al. ......... 370/342 |
| 5,901,180 A | | 5/1999 | Aslanis et al. .............. 370/480 |
| 5,930,366 A | | 7/1999 | Jamal et al. ................. 370/509 |
| 5,940,433 A | | 8/1999 | Sawahashi et al. ......... 370/516 |
| 5,978,416 A | | 11/1999 | Wantanbe et al. .......... 375/350 |
| 5,982,763 A | | 11/1999 | Sato ........................... 370/342 |
| 6,005,903 A | | 12/1999 | Mendelovicz ............... 375/367 |
| 6,078,607 A | * | 6/2000 | Monroe et al. ............. 375/145 |
| 6,128,486 A | | 10/2000 | Keskitalo et al. ........... 455/422 |
| 6,134,262 A | | 10/2000 | Kitade et al. ................ 375/147 |
| 6,192,040 B1 | | 2/2001 | Jalloul et al. ................ 370/335 |
| 6,356,605 B1 | | 3/2002 | Hosur et al. ................. 375/347 |
| 6,363,060 B1 | | 3/2002 | Sarkar ......................... 370/335 |
| 6,363,104 B1 | | 3/2002 | Bottomley ................... 375/148 |
| 6,385,259 B1 | * | 5/2002 | Sung et al. .................. 375/343 |
| 6,424,642 B1 | | 7/2002 | Schmidl et al. ............. 370/342 |
| 6,480,526 B1 | | 11/2002 | Shoki et al. ................. 375/148 |
| 6,487,252 B1 | | 11/2002 | Kleider et al. .............. 370/350 |
| 6,504,830 B1 | | 1/2003 | Ostberg et al. ............. 370/342 |
| 6,553,059 B1 | | 4/2003 | Ito .............................. 375/150 |
| 6,594,473 B1 | | 7/2003 | Dabak et al. ................ 370/339 |

OTHER PUBLICATIONS

TS S1.11 V1.1.0, Mar. 1999, 3GPP"Physical Channels and Mapping of Transport Channels onto Physical Channels", pp. 1–33.

Kohno, Ryuji, Hideki Imai, Mitsutoshi Hatori, and Subbarayan Pasupathy, "Combination of an Adaptive Array Antenna and a Canceller or Interference for Direct–Sequence Spread–Spectrum Multiple–Access System," IEEE Journal on Selected Areas in Communications vol. 8, No. 4, May 1990, pp. 675–682.

TS 25.211 v2.0.1 (Jun. 1996), 3rd Generation Partnership Project (3GPP); Technical Specification Group (TSG); Radio Access Network (RAN); Working Group 1 (WG1); "Physical Channels and Mapping of Transport Channels onto Physical Channels."

Spilker, J.J., Jr., "Digital Communication by Satellite," 1977, Prentice Hall Printer, PPER Saddle River, NJ, pp. 450–454. XP002239986.*.

Maskara S. L. et al., "Concatenated Sequences for Spread Spetrum Systems," IEEE Transactions on Aeroespace and Electronics Systems, New York, NY, vol. AES–17, No. 3, May 1981, XP000791008.*.

Concept Group Alpha, Evaluation Document (Draft 1.0), Part 1, ETSI Tdoc SMG2 270/97, 1997.*.

Baier, A., et al., "Design Study for a CDMA–Based Third-Generation Mobile Radio System," IEEE Journal on selected areas in communications, vol. 12, No. 4, May 1994, pp. 733–743.

Wade, J.G., "Signal Coding and Processing," Ellis Horwood Limited, West Sussex, England, 1987, pp. 86–87and 92–95.

Fiebig, N. Schnell, "Correlation Properties of Extended m–Sequences," Electronic Letters, vol. 29, vol. 20, Sep. 30, 1993, pp. 1753–1756.*.

Proakis, John G., "Digital Communications" McGraw Hill, Inc., New York, NY, 1995, pp. 724–729 and 744–752. (ISBN 0–07–051726–6).

Sarwate, D.V., and M.B. Pursley, "Crosscorrelation Properties of Pseudorandom and Related Sequences," Proceedings of the IEEE, vol. 68, No. 5, May 1980, pp. 593–619.

O'Farrell, T., "New Signature Code Sequence Design Techniques For CDMA Systems," Electronics Letters, Feb. 14, 1991, vol. 27, No. 4, pp. 371–373 (XP000219855).

* cited by examiner

| Bit # | $N_{pilot}=6$ | | | | | | $N_{pilot}=8$ | | | | | | | |
|---|---|---|---|---|---|---|---|---|---|---|---|---|---|---|
| | 0 | 1 | 2 | 3 | 4 | 5 | 0 | 1 | 2 | 3 | 4 | 5 | 6 | 7 |
| slot #1 | 1 | 1 | 1 | 1 | 1 | 1 | 1 | 1 | 1 | 1 | 1 | 1 | 1 | 1 |
| 2 | 1 | 1 | 1 | 1 | 0 | 1 | 1 | 1 | 1 | 1 | 1 | 0 | 1 | 1 |
| 3 | 1 | 0 | 1 | 1 | 0 | 1 | 1 | 0 | 1 | 1 | 1 | 0 | 1 | 1 |
| 4 | 1 | 1 | 0 | 1 | 0 | 1 | 1 | 1 | 1 | 0 | 1 | 0 | 1 | 1 |
| 5 | 1 | 1 | 0 | 1 | 1 | 1 | 1 | 1 | 1 | 0 | 1 | 1 | 1 | 1 |
| 6 | 1 | 1 | 0 | 1 | 1 | 1 | 1 | 1 | 1 | 0 | 1 | 1 | 1 | 1 |
| 7 | 1 | 0 | 1 | 1 | 0 | 0 | 1 | 0 | 1 | 1 | 1 | 0 | 1 | 0 |
| 8 | 1 | 1 | 0 | 1 | 0 | 1 | 1 | 1 | 1 | 0 | 1 | 0 | 1 | 1 |
| 9 | 1 | 1 | 1 | 1 | 0 | 0 | 1 | 1 | 1 | 1 | 1 | 0 | 1 | 0 |
| 10 | 1 | 0 | 1 | 1 | 0 | 1 | 1 | 0 | 1 | 1 | 1 | 0 | 1 | 1 |
| 11 | 1 | 1 | 1 | 1 | 1 | 0 | 1 | 1 | 1 | 1 | 1 | 1 | 1 | 0 |
| 12 | 1 | 0 | 1 | 1 | 0 | 1 | 1 | 0 | 1 | 1 | 1 | 0 | 1 | 1 |
| 13 | 1 | 0 | 0 | 1 | 0 | 1 | 1 | 0 | 1 | 0 | 1 | 0 | 1 | 1 |
| 14 | 1 | 1 | 0 | 1 | 0 | 0 | 1 | 1 | 1 | 0 | 1 | 0 | 1 | 0 |
| 15 | 1 | 0 | 1 | 1 | 0 | 0 | 1 | 0 | 1 | 1 | 1 | 0 | 1 | 0 |
| 16 | 1 | 0 | 0 | 1 | 0 | 0 | 1 | 0 | 1 | 0 | 1 | 0 | 1 | 0 |

FIG. 12A

| Frame Synchronization Words |
|---|
| Slot Number    1 2 3 4 5 . . . . . . . . . . . . . . . L |
| $C_1$ = (1 1 0 1 1 1 1 1 0 0 1 0 0 0 0 0) |
| $C_2$ = (1 0 0 0 1 0 1 0 0 1 1 1 0 1 0 1) |
| $C_3$ = (1 1 0 1 1 1 0 0 0 0 1 0 0 0 1 1) |
| $C_4$ = (0 1 1 1 0 1 1 0 1 0 0 0 1 0 0 1) |
| $C_5$ = (1 0 1 1 0 0 0 0 0 1 0 0 1 1 1 1) |
| $C_6$ = (1 1 1 0 0 1 0 1 0 0 0 1 1 0 1 0) |
| $C_7$ = (0 1 0 0 0 0 1 1 1 0 1 1 1 1 0 0) |
| $C_8$ = (1 1 1 0 1 0 0 1 0 0 0 1 0 1 1 0) |

FIG. 12B

| $R(\tau)$  $\tau$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $R_E(\tau)$ | 16 | 4 | 0 | 4 | 0 | -4 | 0 | -4 | -16 | -4 | 0 | -4 | 0 | 4 | 0 | 4 |
| $R_F(\tau)$ | 16 | -4 | 0 | -4 | 0 | 4 | 0 | 4 | -16 | 4 | 0 | 4 | 0 | -4 | 0 | -4 |
| $R_G(\tau)$ | 16 | 4 | 0 | -4 | 0 | 4 | 0 | -4 | -16 | -4 | 0 | 4 | 0 | -4 | 0 | 4 |
| $R_H(\tau)$ | 16 | -4 | 0 | 4 | 0 | -4 | 0 | 4 | -16 | 4 | 0 | -4 | 0 | 4 | 0 | -4 |

|  | $N_{pilot}$ = 5 | | | | | $N_{pilot}$ = 6 | | | | | |
|---|---|---|---|---|---|---|---|---|---|---|---|
| Bit # | 0 | 1 | 2 | 3 | 4 | 0 | 1 | 2 | 3 | 4 | 5 |
| Slot #1 | 1 | 1 | 1 | 1 | 0 | 1 | 1 | 1 | 1 | 1 | 0 |
| 2 | 1 | 0 | 1 | 1 | 1 | 1 | 1 | 0 | 1 | 1 | 1 |
| 3 | 0 | 0 | 1 | 0 | 1 | 1 | 0 | 0 | 1 | 0 | 1 |
| 4 | 1 | 0 | 1 | 1 | 1 | 1 | 1 | 0 | 1 | 1 | 1 |
| 5 | 1 | 1 | 1 | 1 | 0 | 1 | 1 | 1 | 1 | 1 | 0 |
| 6 | 1 | 0 | 1 | 1 | 1 | 1 | 1 | 0 | 1 | 1 | 1 |
| 7 | 1 | 1 | 1 | 0 | 1 | 1 | 1 | 1 | 1 | 0 | 1 |
| 8 | 1 | 0 | 1 | 0 | 0 | 1 | 1 | 0 | 1 | 0 | 0 |
| 9 | 0 | 0 | 1 | 0 | 1 | 1 | 0 | 0 | 1 | 0 | 1 |
| 10 | 0 | 1 | 1 | 0 | 0 | 1 | 0 | 1 | 1 | 0 | 0 |
| 11 | 1 | 1 | 1 | 1 | 0 | 1 | 1 | 1 | 1 | 1 | 0 |
| 12 | 0 | 1 | 1 | 0 | 0 | 1 | 0 | 1 | 1 | 0 | 0 |
| 13 | 0 | 0 | 1 | 0 | 1 | 1 | 0 | 0 | 1 | 0 | 1 |
| 14 | 0 | 1 | 1 | 0 | 0 | 1 | 0 | 1 | 1 | 0 | 0 |
| 15 | 0 | 0 | 1 | 1 | 0 | 1 | 0 | 0 | 1 | 1 | 0 |
| 16 | 0 | 1 | 1 | 1 | 1 | 1 | 0 | 1 | 1 | 1 | 1 |

FIG. 14B

|  | $N_{pilot} = 7$ | | | | | | | $N_{pilot} = 8$ | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| Slot #1 | 1 | 1 | 1 | 1 | 1 | 0 | 1 | 1 | 1 | 1 | 1 | 1 | 1 | 1 | 0 |
| 2 | 1 | 1 | 0 | 1 | 1 | 1 | 1 | 1 | 1 | 1 | 0 | 1 | 1 | 1 | 1 |
| 3 | 1 | 0 | 0 | 1 | 0 | 1 | 1 | 1 | 0 | 1 | 0 | 1 | 0 | 1 | 1 |
| 4 | 1 | 1 | 0 | 1 | 1 | 1 | 1 | 1 | 1 | 1 | 0 | 1 | 1 | 1 | 1 |
| 5 | 1 | 1 | 1 | 1 | 1 | 0 | 1 | 1 | 1 | 1 | 1 | 1 | 1 | 1 | 0 |
| 6 | 1 | 1 | 0 | 1 | 1 | 1 | 1 | 1 | 1 | 1 | 0 | 1 | 1 | 1 | 1 |
| 7 | 1 | 1 | 1 | 1 | 0 | 1 | 1 | 1 | 1 | 1 | 1 | 0 | 1 | 1 |
| 8 | 1 | 1 | 0 | 1 | 0 | 0 | 1 | 1 | 1 | 1 | 0 | 1 | 0 | 1 | 0 |
| 9 | 1 | 0 | 0 | 1 | 0 | 1 | 1 | 1 | 0 | 1 | 0 | 1 | 0 | 1 | 1 |
| 10 | 1 | 0 | 1 | 1 | 0 | 0 | 1 | 1 | 0 | 1 | 1 | 1 | 0 | 1 | 0 |
| 11 | 1 | 1 | 1 | 1 | 1 | 0 | 1 | 1 | 1 | 1 | 1 | 1 | 1 | 1 | 0 |
| 12 | 1 | 0 | 1 | 1 | 0 | 0 | 1 | 1 | 0 | 1 | 1 | 1 | 0 | 1 | 0 |
| 13 | 1 | 0 | 0 | 1 | 0 | 1 | 1 | 1 | 0 | 1 | 0 | 1 | 0 | 1 | 1 |
| 14 | 1 | 0 | 1 | 1 | 0 | 0 | 1 | 1 | 0 | 1 | 1 | 1 | 0 | 1 | 0 |
| 15 | 1 | 0 | 0 | 1 | 1 | 0 | 1 | 1 | 0 | 1 | 0 | 1 | 1 | 1 | 0 |
| 16 | 1 | 0 | 1 | 1 | 1 | 1 | 1 | 1 | 0 | 1 | 1 | 1 | 1 | 1 | 1 |

FIG. 14C

| $N_{pilot}$ | Pilot bit position # | Corresponding word of length 16 |
|---|---|---|
| 5 | 0 | $C_1$ |
|  | 1 | $C_2$ |
|  | 3 | $C_3$ |
|  | 4 | $C_4$ |
| 6 | 1 | $C_1$ |
|  | 2 | $C_2$ |
|  | 4 | $C_3$ |
|  | 5 | $C_4$ |
| 7 | 1 | $C_1$ |
|  | 2 | $C_2$ |
|  | 4 | $C_3$ |
|  | 5 | $C_4$ |
| 8 | 1 | $C_1$ |
|  | 3 | $C_2$ |
|  | 5 | $C_3$ |
|  | 7 | $C_4$ |

FIG. 14E

|  | $R_x(0)$ | $R_x(1)$ | $R_x(2)$ | $R_x(3)$ | $R_x(4)$ | $R_x(5)$ | $R_x(6)$ | $R_x(7)$ | $R_x(8)$ | $R_x(9)$ | $R_x(10)$ | $R_x(11)$ | $R_x(12)$ | $R_x(13)$ | $R_x(14)$ | $R_x(15)$ |
|---|---|---|---|---|---|---|---|---|---|---|---|---|---|---|---|---|
| $A_1$ POINT | 16 | 4 | 0 | 4 | 0 | -4 | 0 | -4 | -16 | -4 | 0 | -4 | 0 | 4 | 0 | 4 |
| $A_2$ POINT | 16 | -4 | 0 | -4 | 0 | 4 | 0 | 4 | -16 | 4 | 0 | 4 | 0 | -4 | 0 | -4 |
| $A_3$ POINT | 16 | 4 | 0 | 4 | 0 | -4 | 0 | -4 | -16 | -4 | 0 | -4 | 0 | 4 | 0 | 4 |
| $A_4$ POINT | 16 | -4 | 0 | -4 | 0 | 4 | 0 | 4 | -16 | 4 | 0 | 4 | 0 | -4 | 0 | -4 |
| B POINT | 64 | 0 | 0 | 0 | 0 | 0 | 0 | 0 | -64 | 0 | 0 | 0 | 0 | 0 | 0 | 0 |

FIG. 14F

|  | $R_x(0)$ | $R_x(1)$ | $R_x(2)$ | $R_x(3)$ | $R_x(4)$ | $R_x(5)$ | $R_x(6)$ | $R_x(7)$ | $R_x(8)$ | $R_x(9)$ | $R_x(10)$ | $R_x(11)$ | $R_x(12)$ | $R_x(13)$ | $R_x(14)$ | $R_x(15)$ |
|---|---|---|---|---|---|---|---|---|---|---|---|---|---|---|---|---|
| $A_1$ POINT + $A_2$ POINT | 32 | 0 | 0 | 0 | 0 | 0 | 0 | 0 | -32 | 0 | 0 | 0 | 0 | 0 | 0 | 0 |
| $A_3$ POINT + $A_4$ POINT | 32 | 0 | 0 | 0 | 0 | 0 | 0 | 0 | -32 | 0 | 0 | 0 | 0 | 0 | 0 | 0 |
| $A_1$ POINT + $A_4$ POINT | 32 | 0 | 0 | 0 | 0 | 0 | 0 | 0 | -32 | 0 | 0 | 0 | 0 | 0 | 0 | 0 |
| $A_2$ POINT + $A_3$ POINT | 32 | 0 | 0 | 0 | 0 | 0 | 0 | 0 | -32 | 0 | 0 | 0 | 0 | 0 | 0 | 0 |

| | $R_x(0)$ | $R_x(1)$ | $R_x(2)$ | $R_x(3)$ | $R_x(4)$ | $R_x(5)$ | $R_x(6)$ | $R_x(7)$ | $R_x(8)$ | $R_x(9)$ | $R_x(10)$ | $R_x(11)$ | $R_x(12)$ | $R_x(13)$ | $R_x(14)$ | $R_x(15)$ |
|---|---|---|---|---|---|---|---|---|---|---|---|---|---|---|---|---|
| $A_1$ POINT | 16 | -4 | -4 | 8 | 0 | -4 | 0 | 0 | -4 | 0 | 0 | -4 | 0 | 8 | -4 | -4 |
| $A_2$ POINT | 16 | 0 | 0 | -4 | -4 | -4 | 0 | 0 | 12 | 0 | 0 | -4 | -4 | -4 | 0 | 0 |
| $A_3$ POINT | 16 | 4 | 0 | 0 | 4 | 8 | 8 | 0 | 0 | 0 | 8 | 8 | 4 | 0 | 0 | 4 |
| $A_4$ POINT | 16 | 0 | 4 | -4 | 0 | 0 | -4 | 4 | 0 | 4 | -4 | 0 | 0 | -4 | 4 | 0 |
| B POINT | 64 | 0 | 0 | 0 | 0 | 0 | 4 | 4 | 8 | 4 | 4 | 0 | 0 | 0 | 0 | 0 |

FIG. 15A

| | $N_{pilot}=4$ | | $N_{pilot}=8$ | | | | $N_{pilot}=16$ | | | | | | | |
|---|---|---|---|---|---|---|---|---|---|---|---|---|---|---|
| Symbol # | 0 | 1 | 0 | 1 | 2 | 3 | 0 | 1 | 2 | 3 | 4 | 5 | 6 | 7 |
| Slot #1 | 11 | 11 | 11 | 11 | 11 | 10 | 11 | 11 | 11 | 10 | 11 | 11 | 11 | 01 |
| 2 | 11 | 10 | 11 | 10 | 11 | 11 | 11 | 10 | 11 | 11 | 11 | 01 | 11 | 11 |
| 3 | 11 | 00 | 11 | 00 | 11 | 01 | 11 | 00 | 11 | 01 | 11 | 11 | 11 | 01 |
| 4 | 11 | 10 | 11 | 10 | 11 | 11 | 11 | 10 | 11 | 11 | 11 | 10 | 11 | 00 |
| 5 | 11 | 11 | 11 | 11 | 11 | 10 | 11 | 11 | 11 | 10 | 11 | 00 | 11 | 01 |
| 6 | 11 | 10 | 11 | 10 | 11 | 11 | 11 | 10 | 11 | 11 | 11 | 01 | 11 | 00 |
| 7 | 11 | 11 | 11 | 11 | 11 | 01 | 11 | 11 | 11 | 01 | 11 | 00 | 11 | 10 |
| 8 | 11 | 10 | 11 | 10 | 11 | 00 | 11 | 10 | 11 | 00 | 11 | 01 | 11 | 11 |
| 9 | 11 | 00 | 11 | 00 | 11 | 01 | 11 | 00 | 11 | 01 | 11 | 00 | 11 | 10 |
| 10 | 11 | 01 | 11 | 01 | 11 | 00 | 11 | 01 | 11 | 00 | 11 | 10 | 11 | 00 |
| 11 | 11 | 11 | 11 | 11 | 11 | 10 | 11 | 11 | 11 | 10 | 11 | 00 | 11 | 10 |
| 12 | 11 | 01 | 11 | 01 | 11 | 00 | 11 | 01 | 11 | 00 | 11 | 01 | 11 | 11 |
| 13 | 11 | 00 | 11 | 00 | 11 | 01 | 11 | 00 | 11 | 01 | 11 | 11 | 11 | 10 |
| 14 | 11 | 01 | 11 | 01 | 11 | 00 | 11 | 01 | 11 | 00 | 11 | 10 | 11 | 11 |
| 15 | 11 | 00 | 11 | 00 | 11 | 10 | 11 | 00 | 11 | 10 | 11 | 11 | 11 | 01 |
| 16 | 11 | 01 | 11 | 01 | 11 | 11 | 11 | 01 | 11 | 11 | 11 | 10 | 11 | 00 |

FIG. 15B

| Symbol rate | Symbol # | Channel | Corresponding word of length L=16 |
|---|---|---|---|
| $N_{pilot}=4$ | 1 | I-CH | $C_1$ |
| | | Q-CH | $C_2$ |
| $N_{pilot}=8$ | 1 | I-CH | $C_1$ |
| | | Q-CH | $C_2$ |
| | 3 | I-CH | $C_3$ |
| | | Q-CH | $C_4$ |
| $N_{pilot}=16$ | 1 | I-CH | $C_1$ |
| | | Q-CH | $C_2$ |
| | 3 | I-CH | $C_3$ |
| | | Q-CH | $C_4$ |
| | 5 | I-CH | $C_5$ |
| | | Q-CH | $C_6$ |
| | 7 | I-CH | $C_7$ |
| | | Q-CH | $C_8$ |

FIG. 16A

| Symbol # | 0 | 1 | 2 | 3 |
|---|---|---|---|---|
| Slot #1 | 11 | 11 | 11 | 10 |
| 2 | 11 | 10 | 11 | 11 |
| 3 | 11 | 00 | 11 | 01 |
| 4 | 11 | 10 | 11 | 11 |
| 5 | 11 | 11 | 11 | 10 |
| 6 | 11 | 10 | 11 | 11 |
| 7 | 11 | 11 | 11 | 01 |
| 8 | 11 | 10 | 11 | 00 |
| 9 | 11 | 00 | 11 | 01 |
| 10 | 11 | 01 | 11 | 00 |
| 11 | 11 | 11 | 11 | 10 |
| 12 | 11 | 01 | 11 | 00 |
| 13 | 11 | 00 | 11 | 01 |
| 14 | 11 | 01 | 11 | 00 |
| 15 | 11 | 00 | 11 | 10 |
| 16 | 11 | 01 | 11 | 11 |

FIG. 16B

| Symbol # | Channel | Corresponding word of length 16 |
|---|---|---|
| 1 | I-CH | $C_1$ |
| | Q-CH | $C_2$ |
| 3 | I-CH | $C_3$ |
| | Q-CH | $C_4$ |

FIG. 16C

| Symbol rate | $N_{pilot}=8$ | | | | $N_{pilot}=16$ | | | | | | | |
|---|---|---|---|---|---|---|---|---|---|---|---|---|
| Symbol # | 0 | 1 | 2 | 3 | 0 | 1 | 2 | 3 | 4 | 5 | 6 | 7 |
| Slot #1 | 11 | 11 | 11 | 10 | 11 | 11 | 11 | 10 | 11 | 11 | 11 | 01 |
| 2 | 11 | 10 | 11 | 11 | 11 | 10 | 11 | 11 | 11 | 01 | 11 | 11 |
| 3 | 11 | 00 | 11 | 01 | 11 | 00 | 11 | 01 | 11 | 11 | 11 | 01 |
| 4 | 11 | 10 | 11 | 11 | 11 | 10 | 11 | 11 | 11 | 10 | 11 | 00 |
| 5 | 11 | 11 | 11 | 10 | 11 | 11 | 11 | 10 | 11 | 00 | 11 | 01 |
| 6 | 11 | 10 | 11 | 11 | 11 | 10 | 11 | 11 | 11 | 01 | 11 | 00 |
| 7 | 11 | 11 | 11 | 01 | 11 | 11 | 11 | 01 | 11 | 00 | 11 | 10 |
| 8 | 11 | 10 | 11 | 00 | 11 | 10 | 11 | 00 | 11 | 01 | 11 | 11 |
| 9 | 11 | 00 | 11 | 01 | 11 | 00 | 11 | 01 | 11 | 00 | 11 | 10 |
| 10 | 11 | 01 | 11 | 00 | 11 | 01 | 11 | 00 | 11 | 10 | 11 | 00 |
| 11 | 11 | 11 | 11 | 10 | 11 | 11 | 11 | 10 | 11 | 00 | 11 | 10 |
| 12 | 11 | 01 | 11 | 00 | 11 | 01 | 11 | 00 | 11 | 01 | 11 | 11 |
| 13 | 11 | 00 | 11 | 01 | 11 | 00 | 11 | 01 | 11 | 11 | 11 | 10 |
| 14 | 11 | 01 | 11 | 00 | 11 | 01 | 11 | 00 | 11 | 10 | 11 | 11 |
| 15 | 11 | 00 | 11 | 10 | 11 | 00 | 11 | 10 | 11 | 11 | 11 | 01 |
| 16 | 11 | 01 | 11 | 11 | 11 | 01 | 11 | 11 | 11 | 10 | 11 | 00 |

FIG. 16D

| Symbol rate | Symbol # | Channel | Corresponding word of length L=16 |
|---|---|---|---|
| $N_{pilot}=8$ | 1 | I-CH | $C_1$ |
| | | Q-CH | $C_2$ |
| | 3 | I-CH | $C_3$ |
| | | Q-CH | $C_4$ |
| $N_{pilot}=16$ | 1 | I-CH | $C_1$ |
| | | Q-CH | $C_2$ |
| | 3 | I-CH | $C_3$ |
| | | Q-CH | $C_4$ |
| | 5 | I-CH | $C_5$ |
| | | Q-CH | $C_6$ |
| | 7 | I-CH | $C_7$ |
| | | Q-CH | $C_8$ |

| Parameters | Downlink |
|---|---|
| Slot per frame | 16 |
| Number of bits in the DPCCH (Pilot/TPC/TFCI) | 4/2/0 |
| Number of bits in the DPDCH per each slot | 4 |
| Spreading Factor (DPDCH) | 512 |
| Spreading factor (DPCCH) | 512 |
| Modulation | QPSK |
| 3dB bandwidth | 4.096MHz |
| Shaping filter | Root raised cosine (roll off 0.22) |
| Power amplifier | Ideal |
| Propogation channel | AWGN |

FIG. 19A

| Symbol # | $N_{pilot} = 4$ | | $N_{pilot} = 8$ | | | | $N_{pilot} = 16$ | | | | | | | |
|---|---|---|---|---|---|---|---|---|---|---|---|---|---|---|
| | 0 | 1 | 0 | 1 | 2 | 3 | 0 | 1 | 2 | 3 | 4 | 5 | 6 | 7 |
| Slot #1 | 01 | 10 | 11 | 00 | 00 | 10 | 11 | 00 | 00 | 10 | 11 | 11 | 00 | 10 |
| 2 | 00 | 10 | 11 | 01 | 00 | 11 | 11 | 01 | 00 | 11 | 11 | 01 | 00 | 00 |
| 3 | 10 | 10 | 11 | 11 | 00 | 01 | 11 | 11 | 00 | 01 | 11 | 11 | 00 | 10 |
| 4 | 00 | 10 | 11 | 01 | 00 | 11 | 11 | 01 | 00 | 11 | 11 | 10 | 00 | 11 |
| 5 | 01 | 10 | 11 | 00 | 00 | 10 | 11 | 00 | 00 | 10 | 11 | 11 | 00 | 01 |
| 6 | 00 | 10 | 11 | 01 | 00 | 11 | 11 | 01 | 00 | 11 | 11 | 10 | 00 | 00 |
| 7 | 01 | 10 | 11 | 11 | 00 | 10 | 11 | 11 | 00 | 10 | 11 | 00 | 00 | 01 |
| 8 | 00 | 10 | 11 | 10 | 00 | 11 | 11 | 10 | 00 | 11 | 11 | 01 | 00 | 00 |
| 9 | 10 | 10 | 11 | 11 | 00 | 01 | 11 | 11 | 00 | 01 | 11 | 00 | 00 | 01 |
| 10 | 11 | 10 | 11 | 10 | 00 | 00 | 11 | 10 | 00 | 00 | 11 | 10 | 00 | 11 |
| 11 | 01 | 10 | 11 | 00 | 00 | 10 | 11 | 00 | 00 | 10 | 11 | 00 | 00 | 01 |
| 12 | 11 | 10 | 11 | 10 | 00 | 00 | 11 | 10 | 00 | 00 | 11 | 01 | 00 | 00 |
| 13 | 10 | 10 | 11 | 11 | 00 | 01 | 11 | 11 | 00 | 01 | 11 | 00 | 00 | 10 |
| 14 | 11 | 10 | 11 | 10 | 00 | 00 | 11 | 10 | 00 | 00 | 11 | 01 | 00 | 11 |
| 15 | 10 | 10 | 11 | 00 | 00 | 01 | 11 | 00 | 00 | 01 | 11 | 11 | 00 | 10 |
| 16 | 11 | 10 | 11 | 01 | 00 | 00 | 11 | 01 | 00 | 00 | 11 | 10 | 00 | 11 |

FIG. 19B

| Symbol rate | Symbol # | Channel | Corresponding word of length 16 |
|---|---|---|---|
| $N_{pilot} = 4$ | 0 | I – CH | $-C_1$ |
| | | Q – CH | $C_2$ |
| $N_{pilot} = 8$ | 1 | I – CH | $-C_3$ |
| | | Q – CH | $C_4$ |
| | 3 | I – CH | $C_1$ |
| | | Q – CH | $-C_2$ |
| $N_{pilot} = 16$ | 1 | I – CH | $-C_3$ |
| | | Q – CH | $C_4$ |
| | 3 | I – CH | $C_1$ |
| | | Q – CH | $-C_2$ |
| | 5 | I – CH | $-C_7$ |
| | | Q – CH | $C_8$ |
| | 7 | I – CH | $C_5$ |
| | | Q – CH | $-C_6$ |

FIG. 19C

| Symbol # | 0 | 1 | 2 | 3 |
|---|---|---|---|---|
| Slot #1 | 11 | 11 | 00 | 01 |
| 2 | 11 | 10 | 00 | 00 |
| 3 | 11 | 00 | 00 | 10 |
| 4 | 11 | 10 | 00 | 00 |
| 5 | 11 | 11 | 00 | 01 |
| 6 | 11 | 10 | 00 | 00 |
| 7 | 11 | 11 | 00 | 10 |
| 8 | 11 | 10 | 00 | 11 |
| 9 | 11 | 00 | 00 | 10 |
| 10 | 11 | 01 | 00 | 11 |
| 11 | 11 | 11 | 00 | 01 |
| 12 | 11 | 01 | 00 | 11 |
| 13 | 11 | 00 | 00 | 10 |
| 14 | 11 | 01 | 00 | 11 |
| 15 | 11 | 00 | 00 | 01 |
| 16 | 11 | 01 | 00 | 00 |

FIG. 19D

| Symbol rate | Channel | Corresponding word of length 16 |
|---|---|---|
| 1 | I − CH | $C_1$ |
| 1 | Q − CH | $C_2$ |
| 3 | I − CH | $-C_3$ |
| 3 | Q − CH | $-C_4$ |

FIG. 19E

| | $N_{pilot} = 8$ | | | | $N_{pilot} = 16$ | | | | | | | |
|---|---|---|---|---|---|---|---|---|---|---|---|---|
| Symbol # | 0 | 1 | 2 | 3 | 0 | 1 | 2 | 3 | 4 | 5 | 6 | 7 |
| Slot #1 | 11 | 00 | 00 | 10 | 11 | 00 | 00 | 10 | 11 | 11 | 00 | 10 |
| 2 | 11 | 01 | 00 | 11 | 11 | 01 | 00 | 11 | 11 | 01 | 00 | 00 |
| 3 | 11 | 11 | 00 | 01 | 11 | 11 | 00 | 01 | 11 | 11 | 00 | 10 |
| 4 | 11 | 01 | 00 | 11 | 11 | 01 | 00 | 11 | 11 | 10 | 00 | 11 |
| 5 | 11 | 00 | 00 | 10 | 11 | 00 | 00 | 10 | 11 | 11 | 00 | 01 |
| 6 | 11 | 01 | 00 | 11 | 11 | 01 | 00 | 11 | 11 | 10 | 00 | 00 |
| 7 | 11 | 11 | 00 | 10 | 11 | 11 | 00 | 10 | 11 | 00 | 00 | 01 |
| 8 | 11 | 10 | 00 | 11 | 11 | 10 | 00 | 11 | 11 | 01 | 00 | 00 |
| 9 | 11 | 11 | 00 | 01 | 11 | 11 | 00 | 01 | 11 | 00 | 00 | 01 |
| 10 | 11 | 10 | 00 | 00 | 11 | 10 | 00 | 00 | 11 | 10 | 00 | 11 |
| 11 | 11 | 00 | 00 | 10 | 11 | 00 | 00 | 10 | 11 | 00 | 00 | 01 |
| 12 | 11 | 10 | 00 | 00 | 11 | 10 | 00 | 00 | 11 | 01 | 00 | 00 |
| 13 | 11 | 11 | 00 | 01 | 11 | 11 | 00 | 01 | 11 | 00 | 00 | 10 |
| 14 | 11 | 10 | 00 | 00 | 11 | 10 | 00 | 00 | 11 | 01 | 00 | 11 |
| 15 | 11 | 00 | 00 | 01 | 11 | 00 | 00 | 01 | 11 | 11 | 00 | 10 |
| 16 | 11 | 01 | 00 | 00 | 11 | 01 | 00 | 00 | 11 | 10 | 00 | 11 |

FIG. 19F

| Symbol rate | Symbol # | Channel | Corresponding word of length 16 |
|---|---|---|---|
| $N_{pilot} = 8$ | 1 | I - CH | $-C_3$ |
| | | Q - CH | $C_4$ |
| | 3 | I - CH | $C_1$ |
| | | Q - CH | $-C_2$ |
| $N_{pilot} = 16$ | 1 | I - CH | $-C_3$ |
| | | Q - CH | $C_4$ |
| | 3 | I - CH | $C_1$ |
| | | Q - CH | $-C_2$ |
| | 5 | I - CH | $-C_7$ |
| | | Q - CH | $C_8$ |
| | 7 | I - CH | $C_5$ |
| | | Q - CH | $-C_6$ |

FIG. 20A

| Sequence | Autocorrelation |
|---|---|
| $C_1$ = (1 1 0 1 1 1 1 1 0 0 1 0 0 0 0 0) | 16  4  0  4  0 -4  0 -4 -16 -4  0 -4  0  4  0  4 |
| $C_2$ = (1 0 0 0 1 0 1 0 0 1 1 1 0 1 0 1) | 16 -4  0 -4  0  4  0  4 -16  4  0  4  0 -4  0 -4 |
| $C_3$ = (1 1 1 1 1 0 1 1 0 0 0 0 0 1 0 0) | 16  4  0  4  0 -4  0 -4 -16 -4  0 -4  0  4  0  4 |
| $C_4$ = (0 1 0 1 0 0 0 1 1 0 1 0 1 1 1 0) | 16 -4  0 -4  0  4  0  4 -16  4  0  4  0 -4  0 -4 |
| $C_5$ = (0 0 1 1 1 0 1 1 1 1 0 0 0 1 0 0) | 16  4  0 -4  0  4  0 -4 -16 -4  0  4  0 -4  0  4 |
| $C_6$ = (0 0 1 0 0 1 0 1 1 1 0 1 1 0 1 0) | 16 -4  0  4  0 -4  0  4 -16  4  0 -4  0  4  0 -4 |
| $C_7$ = (0 1 1 1 0 0 0 0 1 0 0 0 1 1 1 1) | 16  4  0 -4  0  4  0 -4 -16 -4  0  4  0 -4  0  4 |
| $C_8$ = (1 0 1 1 1 0 1 0 0 1 0 0 0 1 0 1) | 16 -4  0  4  0 -4  0  4 -16  4  0 -4  0  4  0 -4 |
| $C_9$ = (0 0 1 1 0 1 1 1 1 1 0 0 1 0 0 0) | 16  4  0  4  0 -4  0 -4 -16 -4  0 -4  0  4  0  4 |
| $C_{10}$ = (0 0 1 0 1 0 0 1 1 1 0 1 0 1 1 0) | 16 -4  0 -4  0  4  0  4 -16  4  0  4  0 -4  0 -4 |
| $C_{11}$ = (1 1 0 0 0 0 0 1 0 0 1 1 1 1 1 0) | 16  4  0  4  0 -4  0 -4 -16 -4  0 -4  0  4  0  4 |
| $C_{12}$ = (1 0 1 1 1 0 0 1 0 1 0 0 0 1 1 0) | 16 -4  0 -4  0  4  0  4 -16  4  0  4  0 -4  0 -4 |
| $C_{13}$ = (0 1 0 0 0 0 1 1 1 0 1 1 1 1 0 0) | 16  4  0 -4  0  4  0 -4 -16 -4  0  4  0 -4  0  4 |
| $C_{14}$ = (1 0 0 0 1 0 0 1 0 1 1 1 0 1 1 0) | 16 -4  0  4  0 -4  0  4 -16  4  0 -4  0  4  0 -4 |
| $C_{15}$ = (0 0 0 0 1 0 0 0 1 1 1 1 0 1 1 1) | 16  4  0 -4  0  4  0 -4 -16 -4  0  4  0 -4  0  4 |
| $C_{16}$ = (1 0 0 1 0 0 0 1 0 1 1 0 1 1 1 0) | 16 -4  0  4  0 -4  0  4 -16  4  0 -4  0  4  0 -4 |

FIG. 20B

| $R(\tau)$ $\tau$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $R_E(\tau)$ | 16 | 4 | 0 | 4 | 0 | -4 | 0 | -4 | -16 | -4 | 0 | -4 | 0 | 4 | 0 | 4 |
| $R_F(\tau)$ | 16 | -4 | 0 | -4 | 0 | 4 | 0 | 4 | -16 | 4 | 0 | 4 | 0 | -4 | 0 | -4 |
| $R_G(\tau)$ | 16 | 4 | 0 | -4 | 0 | 4 | 0 | -4 | -16 | -4 | 0 | 4 | 0 | -4 | 0 | 4 |
| $R_H(\tau)$ | 16 | -4 | 0 | 4 | 0 | -4 | 0 | 4 | -16 | 4 | 0 | -4 | 0 | 4 | 0 | -4 |

FIG. 20C

| Bit # | Npilot = 6 | | | | | | Npilot = 8 | | | | | | | |
|---|---|---|---|---|---|---|---|---|---|---|---|---|---|---|
| | 0 | 1 | 2 | 3 | 4 | 5 | 0 | 1 | 2 | 3 | 4 | 5 | 6 | 7 |
| Slot #1 | 1 | 1 | 1 | 1 | 1 | 0 | 1 | 1 | 1 | 1 | 1 | 1 | 1 | 0 |
| 2 | 1 | 1 | 0 | 1 | 1 | 1 | 1 | 1 | 1 | 0 | 1 | 1 | 1 | 1 |
| 3 | 1 | 0 | 0 | 1 | 1 | 0 | 1 | 0 | 1 | 0 | 1 | 1 | 1 | 0 |
| 4 | 1 | 1 | 0 | 1 | 1 | 1 | 1 | 1 | 1 | 0 | 1 | 1 | 1 | 1 |
| 5 | 1 | 1 | 1 | 1 | 1 | 0 | 1 | 1 | 1 | 1 | 1 | 1 | 1 | 0 |
| 6 | 1 | 1 | 0 | 1 | 0 | 0 | 1 | 1 | 1 | 0 | 1 | 0 | 1 | 0 |
| 7 | 1 | 1 | 1 | 1 | 1 | 0 | 1 | 1 | 1 | 1 | 1 | 1 | 1 | 0 |
| 8 | 1 | 1 | 0 | 1 | 1 | 1 | 1 | 1 | 1 | 0 | 1 | 1 | 1 | 1 |
| 9 | 1 | 0 | 0 | 1 | 0 | 1 | 1 | 0 | 1 | 0 | 1 | 0 | 1 | 1 |
| 10 | 1 | 0 | 1 | 1 | 0 | 0 | 1 | 0 | 1 | 1 | 1 | 0 | 1 | 0 |
| 11 | 1 | 1 | 1 | 1 | 0 | 1 | 1 | 1 | 1 | 1 | 1 | 0 | 1 | 1 |
| 12 | 1 | 0 | 1 | 1 | 0 | 0 | 1 | 0 | 1 | 1 | 1 | 0 | 1 | 0 |
| 13 | 1 | 0 | 0 | 1 | 0 | 1 | 1 | 0 | 1 | 0 | 1 | 0 | 1 | 1 |
| 14 | 1 | 0 | 1 | 1 | 1 | 1 | 1 | 0 | 1 | 1 | 1 | 1 | 1 | 1 |
| 15 | 1 | 0 | 0 | 1 | 0 | 1 | 1 | 0 | 1 | 0 | 1 | 0 | 1 | 1 |
| 16 | 1 | 0 | 1 | 1 | 0 | 0 | 1 | 0 | 1 | 1 | 1 | 0 | 1 | 0 |

FIG. 20D

| Npilots | Pilot bit position # | Corresponding word of length 16 |
|---|---|---|
| 6 | 1 | $C_1$ |
| | 2 | $C_2$ |
| | 4 | $C_3$ |
| | 5 | $C_4$ |
| 8 | 1 | $C_1$ |
| | 3 | $C_2$ |
| | 5 | $C_3$ |
| | 7 | $C_4$ |

FIG. 20E

| Symbol rate | 8ksps | | 16,32,64,128ksps | | | | 256,512,1024ksps | | | | | | | |
|---|---|---|---|---|---|---|---|---|---|---|---|---|---|---|
| Symbol # | 0 | 1 | 0 | 1 | 2 | 3 | 0 | 1 | 2 | 3 | 4 | 5 | 6 | 7 |
| Slot #1 | 11 | 11 | 11 | 11 | 11 | 10 | 11 | 11 | 11 | 10 | 11 | 00 | 11 | 01 |
| 2 | 11 | 10 | 11 | 10 | 11 | 11 | 11 | 10 | 11 | 11 | 11 | 00 | 11 | 10 |
| 3 | 11 | 00 | 11 | 00 | 11 | 10 | 11 | 00 | 11 | 10 | 11 | 11 | 11 | 11 |
| 4 | 11 | 10 | 11 | 10 | 11 | 11 | 11 | 10 | 11 | 11 | 11 | 10 | 11 | 11 |
| 5 | 11 | 11 | 11 | 11 | 11 | 10 | 11 | 11 | 11 | 10 | 11 | 10 | 11 | 01 |
| 6 | 11 | 10 | 11 | 10 | 11 | 00 | 11 | 10 | 11 | 00 | 11 | 01 | 11 | 00 |
| 7 | 11 | 11 | 11 | 11 | 11 | 10 | 11 | 11 | 11 | 10 | 11 | 10 | 11 | 01 |
| 8 | 11 | 10 | 11 | 10 | 11 | 11 | 11 | 10 | 11 | 11 | 11 | 11 | 11 | 00 |
| 9 | 11 | 00 | 11 | 00 | 11 | 01 | 11 | 00 | 11 | 01 | 11 | 11 | 11 | 10 |
| 10 | 11 | 01 | 11 | 01 | 11 | 00 | 11 | 01 | 11 | 00 | 11 | 11 | 11 | 01 |
| 11 | 11 | 11 | 11 | 11 | 11 | 01 | 11 | 11 | 11 | 01 | 11 | 00 | 11 | 00 |
| 12 | 11 | 01 | 11 | 01 | 11 | 00 | 11 | 01 | 11 | 00 | 11 | 01 | 11 | 00 |
| 13 | 11 | 00 | 11 | 00 | 11 | 01 | 11 | 00 | 11 | 01 | 11 | 01 | 11 | 10 |
| 14 | 11 | 01 | 11 | 01 | 11 | 11 | 11 | 01 | 11 | 11 | 11 | 10 | 11 | 11 |
| 15 | 11 | 00 | 11 | 00 | 11 | 01 | 11 | 00 | 11 | 01 | 11 | 01 | 11 | 10 |
| 16 | 11 | 01 | 11 | 01 | 11 | 00 | 11 | 01 | 11 | 00 | 11 | 00 | 11 | 11 |

FIG. 20F

| Symbol rate | 2048,4096ksps | | | | | | | | | | | | | | | |
|---|---|---|---|---|---|---|---|---|---|---|---|---|---|---|---|---|
| Symbol # | 0 | 1 | 2 | 3 | 4 | 5 | 6 | 7 | 8 | 9 | 10 | 11 | 12 | 13 | 14 | 15 |
| Slot #1 | 11 | 11 | 11 | 10 | 11 | 00 | 11 | 01 | 11 | 00 | 11 | 11 | 11 | 01 | 11 | 01 |
| 2 | 11 | 10 | 11 | 11 | 11 | 00 | 11 | 10 | 11 | 00 | 11 | 10 | 11 | 10 | 11 | 00 |
| 3 | 11 | 00 | 11 | 10 | 11 | 11 | 11 | 11 | 11 | 11 | 11 | 01 | 11 | 00 | 11 | 00 |
| 4 | 11 | 10 | 11 | 11 | 11 | 10 | 11 | 11 | 11 | 10 | 11 | 01 | 11 | 00 | 11 | 01 |
| 5 | 11 | 11 | 11 | 10 | 11 | 10 | 11 | 01 | 11 | 01 | 11 | 01 | 11 | 01 | 11 | 10 |
| 6 | 11 | 10 | 11 | 00 | 11 | 01 | 11 | 00 | 11 | 10 | 11 | 00 | 11 | 00 | 11 | 00 |
| 7 | 11 | 11 | 11 | 10 | 11 | 10 | 11 | 01 | 11 | 10 | 11 | 00 | 11 | 10 | 11 | 00 |
| 8 | 11 | 10 | 11 | 11 | 11 | 11 | 11 | 00 | 11 | 11 | 11 | 11 | 11 | 11 | 11 | 01 |
| 9 | 11 | 00 | 11 | 01 | 11 | 11 | 11 | 10 | 11 | 11 | 11 | 00 | 11 | 10 | 11 | 10 |
| 10 | 11 | 01 | 11 | 00 | 11 | 11 | 11 | 01 | 11 | 11 | 11 | 01 | 11 | 01 | 11 | 11 |
| 11 | 11 | 11 | 11 | 01 | 11 | 00 | 11 | 00 | 11 | 00 | 11 | 10 | 11 | 11 | 11 | 11 |
| 12 | 11 | 01 | 11 | 00 | 11 | 01 | 11 | 00 | 11 | 01 | 11 | 10 | 11 | 11 | 11 | 10 |
| 13 | 11 | 00 | 11 | 01 | 11 | 01 | 11 | 10 | 11 | 10 | 11 | 10 | 11 | 10 | 11 | 01 |
| 14 | 11 | 01 | 11 | 11 | 11 | 10 | 11 | 11 | 11 | 01 | 11 | 11 | 11 | 11 | 11 | 11 |
| 15 | 11 | 00 | 11 | 01 | 11 | 01 | 11 | 10 | 11 | 01 | 11 | 11 | 11 | 01 | 11 | 11 |
| 16 | 11 | 01 | 11 | 00 | 11 | 00 | 11 | 11 | 11 | 00 | 11 | 00 | 11 | 00 | 11 | 10 |

FIG. 20G

| Symbol rate | Symbol # | Channel | Corresponding word of length 16 |
|---|---|---|---|
| 8ksps | 1 | I - CH | $C_1$ |
| | | Q - CH | $C_2$ |
| 16, 32, 64, 128ksps | 1 | I - CH | $C_1$ |
| | | Q - CH | $C_2$ |
| | 3 | I - CH | $C_3$ |
| | | Q - CH | $C_4$ |
| 256, 512, 1024ksps | 1 | I - CH | $C_1$ |
| | | Q - CH | $C_2$ |
| | 3 | I - CH | $C_3$ |
| | | Q - CH | $C_4$ |
| | 5 | I - CH | $C_5$ |
| | | Q - CH | $C_6$ |
| | 7 | I - CH | $C_7$ |
| | | Q - CH | $C_8$ |
| 2048, 4096ksps | 1 | I - CH | $C_1$ |
| | | Q - CH | $C_2$ |
| | 3 | I - CH | $C_3$ |
| | | Q - CH | $C_4$ |
| | 5 | I - CH | $C_5$ |
| | | Q - CH | $C_6$ |
| | 7 | I - CH | $C_7$ |
| | | Q - CH | $C_8$ |
| | 9 | I - CH | $C_9$ |
| | | Q - CH | $C_{10}$ |
| | 11 | I - CH | $C_{11}$ |
| | | Q - CH | $C_{12}$ |
| | 13 | I - CH | $C_{13}$ |
| | | Q - CH | $C_{14}$ |
| | 15 | I - CH | $C_{15}$ |
| | | Q - CH | $C_{16}$ |

FIG. 20H

| Symbol # | 0 | 1 | 2 | 3 |
|---|---|---|---|---|
| Slot #1 | 11 | 11 | 11 | 10 |
| 2 | 11 | 10 | 11 | 11 |
| 3 | 11 | 00 | 11 | 10 |
| 4 | 11 | 10 | 11 | 11 |
| 5 | 11 | 11 | 11 | 10 |
| 6 | 11 | 10 | 11 | 00 |
| 7 | 11 | 11 | 11 | 10 |
| 8 | 11 | 10 | 11 | 11 |
| 9 | 11 | 00 | 11 | 01 |
| 10 | 11 | 01 | 11 | 00 |
| 11 | 11 | 11 | 11 | 01 |
| 12 | 11 | 01 | 11 | 00 |
| 13 | 11 | 00 | 11 | 01 |
| 14 | 11 | 01 | 11 | 11 |
| 15 | 11 | 00 | 11 | 01 |
| 16 | 11 | 01 | 11 | 00 |

FIG. 20I

| Symbol # | Channel | Corresponding word of length 16 |
|---|---|---|
| 1 | I-CH | $C_1$ |
| | Q-CH | $C_2$ |
| 3 | I-CH | $C_3$ |
| | Q-CH | $C_4$ |

PILOT SIGNALS FOR SYNCHRONIZATION AND/OR CHANNEL ESTIMATION

BACKGROUND OF THE INVENTION

1. Field of the Invention

The present invention relates to communication systems, and more particularly, cellular communication systems.

2. Background of the Related Art

The use of code division multiple access (CDMA) modulation techniques is one of several techniques for facilitating communications in which a large number of systems are present. FIG. 1 generally illustrates a system 10, which uses CDMA modulation techniques in communication between user equipment (UE) 12a and 12b, each UE including a cellular telephone, and base stations (BTS) 14a and 14b. A base station controller (BSC) 16 typically includes an interface and processing circuitry for providing system control to the BTS 14a, 14b. The BSC 16 controls the routing of telephone calls from the public switched telephone network (PSTN) to the appropriate BTS for transmission to the appropriate UE. The BSC 16 also controls the routing of calls from the UEs, via at least one BTS to the PSTN. The BSC 16 may direct calls between UEs via the appropriate BTS since UEs do not typically communicate directly with one another. The BSC 16 may be coupled to the BTS 14a and 14b by various means including dedicated telephone lines, optical fiber links or by microwave communication links.

The arrows 13a–13d define the possible communication links between the BTS 14a and UEs 12a and 12b. The arrows 15a–15d define the possible communication links between the BTS 14ba and UEs 12a and 12b. In the reverse channel or uplink (i.e., from UE to BTS), the UE signals is received by BTS 14a and/or BTS 14b, which, after demodulation and combining, pass the signal forward to the combining point, typically to the BSC 16. In the forward channel or downlink (i.e., from BTS to UE), the BTS signals are received by UE 12a and/or UE 12b. The above system is described in U.S. Pat. Nos. 5,101,501; 5,103,459; 5,109,390; and 5,416,797, whose entire disclosure is hereby incorporated by reference therein.

A radio channel is a generally hostile medium in nature. It is rather difficult to predict its behavior. Traditionally, the radio channels are modeled in a statistical way using real propagation measurement data. In general, the signal fading in a radio environment can be decomposed into a large-scale path loss component together with a medium-scale slow varying component having a log-normal distribution, and a small-scale fast varying component with a Rician or Rayleigh distribution, depending on the presence or absence of the line-of-sight (LOS) situation between the transmitter and the receiver.

FIG. 2 illustrates these three different propagation phenomena. An extreme variation in the transmission path between the transmitter and receiver can be found, ranging from direct LOS to severely obstructed paths due to buildings, mountains, or foliage. The phenomenon of decreasing received power with distance due to reflection, diffraction around structures, and refraction is known as path loss.

As shown, the transmitted signal is reflected by many obstacles between a transmitter and a receiver, thus creating a multipath channel. Due to the interference among many multipaths with different time delays, the received signal suffers from frequency selective multipath fading. For example, when the 2 GHz carrier frequency band is used and a car having a UE is travelling at a speed of 100 km/h, the maximum Doppler frequency of fading is 185 Hz. While coherent detection can be used to increase link capacity, under such fast fading, the channel estimation for coherent detection is generally very difficult to achieve. Because of fading channels, it is hard to obtain a phase reference for the coherent detection of data modulated signal. Therefore, it is beneficial to have a separate pilot channel.

Typically, a channel estimate for coherent detection is obtained from a common pilot channel. However, a common pilot channel transmitted with an omnidirectional antenna experiences a different radio channel than a traffic channel signal transmitted through a narrow beam. It has been noticed that common control channels are often problematic in the downlink when adaptive antennas are used. The problem can be circumvented by user dedicated pilot symbols, which are used as a reference signal for the channel estimation. The dedicated pilot symbols can either be time or code multiplexed.

FIG. 3 depicts a block diagram of a transmitter and a receiver for time multiplexed pilot symbols for an improved channel estimation method that works satisfactorily under slow-to-fast fading environments. Known pilot symbols are periodically multiplexed with the sequence of the transmitted data. The pilot symbols and data symbols following pilot symbols constitute a slot, as shown in FIG. 3.

Further, in a DS-CDMA transmitter, the information signal is modulated by a spreading code, and in the receiver, it is correlated with a replica of the same code. Thus, low cross-correlation between the desired and interfering users is important to suppress the multiple access interference. Good autocorrelation properties are required for reliable initial synchronization, since large sidelobes of the autocorrelation function may lead to erroneous code synchronization decisions. Furthermore, good autocorrelation properties are important to reliably separate the multipath components.

Since the autocorrelation function of a spreading code should resemble, as much as possible, the autocorrelation function of white Gaussian noise, the DS code sequences are also called pseudo-noise (PN) sequences. The autocorrelation and cross-correlation functions are connected in such a way that it is not possible to achieve good autocorrelation and cross-correlation values simultaneously. This can be intuitively explained by noting that having good autocorrelation properties is also an indication of good randomness of a sequence. Random codes exhibit worse cross-correlation properties than deterministic codes.

Such mobile communication system has gone through different stages of evolution, and various countries used different standards. First generation mobile systems in the 1980s used analog transmission for speech services. Advanced Mobile Phone Service (AMPS) in the United States, Total Access Communication System (TACS) in the United Kingdom, Nordic Mobile Telephones (NMT) in Scandinavia, Nippon Telephone and Telegraph (NTT) in Japan, etc., belonged to the first generation.

Second generation systems using digital transmission were introduced in the late 1980s. They offer higher spectrum efficiency, better data services, and more advanced roaming than the first generation systems. Global System for Mobile Communications (GSM) in Europe, Personal Digital Cellular (PDC) in Japan, and IS-95 in the United States belonged to the second generation.

Recently, third generation mobile radio networks have been under intense research and discussion and will emerge around the year 2000. In the International Telecommunication Union (ITU), the third generation networks are called International Mobile Telecommunications-2000 (IMT-2000) and in Europe, Universal Mobile Telecommunication System (UMTS). IMT-2000 will provide a multitude of services, including multimedia and high bit rate packet data.

Wideband CDMA has emerged as the mainstream air interface solution for the third generation networks. Wideband CDMA systems are currently being standardized by the European Telecommunications Standards Institute (ETSI) of Europe, the Association for Radio Industry and Business (ARIB) of Japan, the TIA Engineering Committees TR45 and TR46 and the T1 committee T1P1 of the United States, and the Telecommunication Technology Association TTA I and TTA II (renamed Global CDMA I and II, respectively) in Korea. The above description and a background of various systems can be found in WIDEBAND CDMA FOR THIRD GENERATION MOBILE COMMUNICATIONS by T. Ojanpera et al, published 1998, by Artech House Publishers, whose entire disclosure is hereby incorporated by reference therein.

Recently, ARIB in Japan, ETSI in Europe, T1 in U.S.A., and TTA in Korea have mapped out a third generation mobile communication system based on a core network and radio access technique of an existing global system for mobile communications (GSM) to provide various services including multimedia, such as audio, video and data. They have agreed to a partnership study for the presentation of a technical specification on the evolved next generation mobile communication system and named a project for the partnership study as a third generation partnership project (3GPP).

The 3GPP is classified into three part technical studies. The first part is a 3GPP system structure and service capability based on the 3GPP specification. The second part is a study of a universal terrestrial radio access network (UTRAN), which is a radio access network (RAN) applying wideband CDMA technique based on a frequency division duplex (FDD) mode, and a TD-CDMA technique based on a time division duplex (TDD) mode. The third part is a study of a core network evolved from a second generation GSM, which has third generation networking capabilities, such as mobility management and global roaming.

Among the technical studies of the 3GPP, the UTRAN study defines and specifies the transport and physical channels. This technical specification, TS S1.11 v 1.1.0, was distributed on March of 1999, whose entire disclosure is hereby incorporated by reference therein. The physical channel includes the dedicated physical channels DPCHs) used in the uplink and downlink. Each DPCH is generally provided with three layers, e.g., superframes, radio frames and timeslots. As specified in the 3GPP radio access network (RAN) standard, a superframe has a maximum frame unit of 720 ms period. In view of the system frame numbers, one superframe is composed of seventy-two radio frames. Each radio frame has a period of 10 ms, and a radio frame includes sixteen timeslots, each of which includes fields with corresponding information bits based on the DPCH.

FIG. 4 illustrates a frame structure of an uplink DPCH based on the 3GPP RAN standard. The uplink DPCH is provided with two types of channels, e.g., a dedicated physical data channel (DPDCH) and a dedicated physical control channel (DPCCH). The uplink DPDCH is adapted to transport the dedicated data and the uplink DPCCH is adapted to transport the control information.

The uplink DPCCH for the transport of the control information includes various fields such as a pilot field 21 of $N_{pilot}$ bits, a transmit power-control (TPC) field 22 of $N_{TPC}$ bits, a feedback information (FBI) field 23 of $N_{FBI}$ bits and an optional transport-combination indicator (TFCI) field 24 of $N_{TFCI}$ bits. The pilot field 21 includes pilot bits $N_{pilot}$ for supporting channel estimation for coherent detection. The TFCI field 4 supports the simultaneous provision of a plurality of services by the system. The absence of the TFCI field 4 in the uplink DPCCH signifies that the associated service is a fixed rate service. The parameter k determines the number of bits per uplink DPDCH/DPCCH slot. It is related to the spreading factor SF of the physical channel as $SF=256/2^k$. The spreading factor SF may thus range from 256 down to 4.

FIG. 5 is a table showing various information of the uplink DPCCH, wherein channel bit and symbol rates are those just prior to spreading. (At the time of this technical specification, the exact number of bits of the different uplink DPCCH fields of FIG. 4 ($N_{pilot}$, $N_{TPC}$, $N_{FBI}$, and $N_{TFCI}$) was not determined.)

FIG. 6 is a table illustrating pilot bit patterns of the uplink DPCCH, and more particularly, 6-bit and 8-bit pilot bit patterns for each slot. In FIG. 6, the non-shaded sequence is used for channel estimation, and shaded sequence can be used as frame synchronization words or sequences. The pilot bits other than frame synchronization word, e.g., channel estimation word, have a value of 1.

For example, in the case where each slot includes six pilot bits $N_{pilot}$=6, the sequences formed by slot #1 to slot #16 at bit #1, at bit #2, at bit #4, and at bit #5 are used as the frame synchronization words. In the case where each slot is composed of eight pilot bits ($N_{pilot}$=8), the sequences at bit #1, at bit #3, at bit #5, and at bit #7 are used as the frame synchronization words. In the case where the pilot bits of each sequences slot are either 6 or 8 in number, a total of four is used as the frame synchronization word. As a result, because one radio frame is provided with sixteen timeslots, the number of pilot bits used as the frame synchronization word is 64 bits per frame.

FIG. 7 shows a spreading/scrambling arrangement for the uplink DPCH based on the 3GPP RAN standard. The arrangement of FIG. 7 is provided for the execution of a quadrature phase shift keying (QPSK) operation where the uplink DPDCH and DPCCH are mapped into I and Q channel branches, respectively.

The spreading is an operation for switching all symbols through the respective channel branches to a plurality of chips. The I and Q channel branches are spread respectively at chip rates based on two different orthogonal variable spreading factors (OVSFs), or channelizing codes $C_D$ and $C_C$. The OVSF represents the number of chips per symbol on each channel branch. The spread of two channel branches are summed and then complex-scrambled by a specific complex scrambling code $C_{scramb}$. The complex-scrambled result is separated into real and imaginary and then transmitted after being placed on respective carriers.

FIG. 8 illustrates a frame structure of a downlink DPCH based on the 3GPP RAN standard. The number of pilot bits (or symbols) in the uplink DPCH is 6 or 8 because the uplink DPCH is activated at a fixed rate of 16 Kbps. However, since the downlink DPCH is activated at a variable rate, it has pilot symbol patterns illustrated in FIG. 9.

With reference to FIG. 8, similar to the uplink DPCH, the downlink DPCH is provided with two types of channels, e.g., a dedicated physical data channel (DPDCH) and a dedicated physical control channel (DPCCH). In the downlink DPCH, the downlink DPDCH is adapted to transport the dedicated data and the downlink DPCCH is adapted to transport the control information. The downlink DPCCH for transporting the control information is composed of various fields such as a pilot field 27, TPC field 26 and TFCI field 25. The pilot field 27 includes pilot symbols for supporting the channel estimation for coherent detection.

FIG. 9 is a table illustrating pilot symbol patterns contained in the downlink DPCCH, which are classified according to different symbol rates of the downlink DPCCH. For example, in the case where the symbol rate is 16, 32, 64 or 128 Kbps, each slot includes four pilot symbols for an I channel branch and four pilot symbols for a Q channel branch, totaling eight pilot symbols.

In FIG. 9, the non-shaded sequence is used for channel estimation and shaded sequences can be used as frame synchronization words. The remaining pilot symbols other than the frame synchronization word (e.g., channel estimation) have a value of 11. For example, in the case where the symbol rate is 16, 32, 64 or 128 Kbps, the sequences, formed by pilot symbols from slot #1 to slot #16, at symbol #1 and at symbol #3 are used as the frame synchronization words. Accordingly, because the number of pilot symbols used as the frame synchronization words is 4 per slot, 64 pilot symbols are used in each radio frame.

FIG. 10 illustrates a spreading/scrambling arrangement for the downlink DPCH based on the 3GPP RAN standard. The arrangement of FIG. 10 is provided for the spreading and scrambling of the downlink DPCH and a common control physical channel (CCPCH). A QPSK operation is performed with respect to a pair of symbols of the two channels in such a manner that they are serial-to-parallel converted and then mapped into I and Q channel branches, respectively.

The I and Q channel branches are spread respectively at chip rates based on two equal channelizing codes $C_{ch}$. The spread of the two channel branches are summed and then complex-scrambled by a specific complex scrambling code $C_{scramb}$. The complex-scrambled result is separated into real and imaginary and then transmitted, after being placed on respective carriers. Noticeably, the same scrambling code is used for all physical channels in one cell, whereas different channelizing codes are used for different physical channels. Data and various control information are transported to a receiver through the uplink and downlink DPCHs subjected to the above-mentioned spreading and scrambling.

The TS S1.11 v1.1.0 specification also specified a primary common control physical channel (PCCPCH), which is a fixed rate downlink physical channel used to carry the broadcast channel (BCH), and a secondary common control physical channel (SCCPCH) used to carry the forward access channel (FACH) and the paging channel (PCH) at a constant rate. FIGS. 11A and 11B illustrate the frame structure of PCCPCH and SCCPCH, each having a pilot field. The TS S1.11 v1.1.0 specification recommended the pilot patterns for the PCCPCH and SCCPCH. Further, the TS S1.11 v1.1.0 specification recommended the pilot pattern of the DPCH channel for the diversity antenna using open loop antenna diversity based on space time block coding based transmit diversity (STTD) and diversity antenna pilot patterns for PCCPCH and SCCPCH. Those patterns can be found in the TS S1.11 v1.1.0 specification, and detailed description is being omitted.

For frame synchronization, an autocorrelation function must be performed on the basis of the pilot pattern sequence. In the pilot sequence design, finding an autocorrelation of a sequence with the lowest out-of-phase coefficient is important to decrease the probability of false alarm regarding the synchronization. A false alarm is determined when a peak is detected when there should not be a peak detection.

Optimally, the result of the autocorrelation for a frame with a sequence at a prescribed pilot bit should have same maximum values at zero and middle time shifts of one correlation period, which are different in polarity, and the remaining sidelobes at time shifts other than zero and middle should have a value of zero. However, the various pilot patterns recommended in the TS S1.11 v1.1.0 do not meet this requirement, both in the uplink and downlink.

In an article entitled "Synchronization Sequence Design with Double Thresholds for Digital Cellular Telephone" by Young Joon Song et al. (Aug. 18–20, 1998), the present inventor being a co-author, the article describes a correlator circuit for GSM codes where the out-of-phase coefficients are all zero except one exception at zero and middle shift having a first peak and a second peak, where the first and second peaks are opposite in polarity, but the peaks are not equal to one another. Further, the article describes lowest out-of-phase coefficients of +4 and −4. However, the article does not provide how such sequences and autocorrelation can be used to achieve the above described optimal results, and the article does not provide sufficient disclosure that the sequences achieve or can achieve the lowest autocorrelation sidelobes.

As described above, the pilot patterns used as frame synchronization words or sequences do not achieve the optimal results. Further, the background pilot patterns do not rapidly and accurately perform the frame synchronization. Moreover, the above pilot patterns and frame synchronization sequences do not provide optimal cross-correlation and autocorrelation. Additionally, neither the TS specification nor the article provides a solution of the use of the pilot patterns for slot-by-slot double check frame synchronization scheme, and neither discloses the use of the frame synchronization sequence for channel estimation.

SUMMARY OF THE INVENTION

An object of the present invention is to obviate at least the problems and disadvantages of the related art.

An object of the present invention is to provide frame synchronization words resulting in optimal autocorrelation results.

A further object of the present invention is to eliminate or prevent sidelobes.

A further object of the present invention is to provide maximum values at zero and middle time shifts.

Another object of the present invention is to provide a synchronization word for at least one of rapid and accurate frame synchronization.

Another object of the present invention is to provide a slot-by-slot double check frame synchronization scheme.

Still another object of the present invention is to provide a frame synchronization word which can be used for channel estimation.

Still another object of the present invention is to provide good cross-correlation and autocorrelation simultaneously.

The present invention can be achieved in a whole or in parts by a method for synchronizing a frame using an optimal pilot symbol, comprising the steps of: (1) receiving a pilot symbol of each slot in the frame through respective physical channels on a communication link; (2) correlating a received position of each of the pilot symbols to a corresponding pilot sequence; (3) combining and summing more than one results of the correlations, and deriving a final result from the correlations in which sidelobes from the results of the correlations are offset; and (4) synchronizing the frame using the final result.

The pilot symbols are combined into each of the pilot sequences such that the final result of the correlations shows sidelobes with 0" values excluding particular positions of correlation periods. The particular positions are starting points (x=0) of the correlation periods (x) and points of x/an integer. The pilot symbol is a combination of pilot symbols in a form of (a,/a). The pilot sequence provides least correlation resultants at positions excluding the starting points and half of the starting points in the correlation periods. The pilot symbols excluding the pilot symbols used in the correlation is used in a channel estimation for detecting coherent. The pilot symbol of each slot in the frame is transmitted, with the pilot symbol contained in a pilot field of an exclusive physical control channel among respective exclusive channels on the communication link. The pilot sequences different from each other on an up communication link are used in the correlation according to values of bits included in a pilot field of an exclusive physical control channel. The pilot sequences different from each other on a down communication link are used in the correlation according to a symbol rate of an exclusive physical control channel.

The present invention can be also achieved in a whole or in parts by a method for synchronizing a frame using an optimal pilot symbol, comprising the steps of: (1) receiving a pilot symbol of each slot in the frame through respective physical channels on a communication link; (2) correlating a received position of each of the pilot symbols to a corresponding pilot sequence; (3) combining and summing more than one results of the correlations, and deriving a final result from the correlations in which sidelobes from the results of the correlations have minimum values and the results of the correlations at starting points and middle points of correlation periods have maximum values with different polarity; and (4) synchronizing the frame using the final result.

The present invention can be achieved in a whole or in parts by a method of eliminating sidelobes in a communication channel between a base station and a mobile station, comprising the steps of: generating control signals and data signals within the communication channel, the control signals having a first sequence of L-bits and a second sequence of L-bits; generating a first set of prescribed values based on the first sequence, which has a first prescribed relationship with the first set of prescribed values; generating a second set of prescribed values based on the second sequence, which has a second prescribed relationship with the second set of prescribed values; and combining the first and second sets of prescribed values.

The present invention can be achieved in a whole or in parts by a method of establishing a communication channel, the method comprising the steps of: generating a plurality of frames; generating a L-number of slots for each frame, each slot having a pilot signal of N-bits and a corresponding bit in each slot forming a word of L-sequence of pilot bits such that there is N number of words, wherein the number of bit values of two pilot bits which are the same between two adjacent words from 1 to L slots minus the number of bit values of two pilot bits which are different between the two adjacent words from 1 to L is zero or a prescribed number close to zero.

The present invention can be achieved in a whole or in parts by a method of establishing a communication channel having at least one of frame synchronization and channel estimation, the method comprising the steps of: generating a plurality of frames; generating a L-number of slots for each frame, each slot having a pilot signal of N-bits and a corresponding bit in each slot forming a word of L-sequence of pilot bits such that there is N number of words, wherein the words have at least one of the following characteristics: cross-correlation between two adjacent sequences used for frame synchronization is zero at zero time shift, or cross-correlation between a word used for frame synchronization and a word used for channel estimation is zero at all time shifts.

The present invention can be achieved in a whole or in parts by a method of reducing sidelobes for frame synchronization, comprising the steps of: generating a plurality of frame synchronization words, each frame synchronization word having a plurality of bits; performing autocorrelation functions on a pair of frame synchronization words to generate a pair of prescribed value sets; and combining the pair of prescribed value sets such that two peak values equal in magnitude and opposite in polarity are achieved at zero and middle time shifts.

The present invention can be achieved in a whole or in parts by a method of generating pilot signals of a prescribed pattern within a frame having L-number of slots, comprising the steps of: generating N-number of pilot bits for each slot; and forming N-number of words of L-bit based on above step, wherein a prescribed number of words is used for frame synchronization words and each frame synchronization word has a first prescribed number $b_0$ of bit values of "0" and a second prescribed number $b_1$ of bit values of "1", such that $b_1$-$b_0$ is equal to zero or a number close to zero.

The present invention can be achieved in a whole or in parts by a communication link between a user equipment and a base station comprising a plurality of layers, wherein one of the layers is a physical layer for establishing communication between the user equipment and the base station and the physical layer has at least one of data and control information, one of the control information being a pilot field of N-bits transmitted for L-number of slots such that N-number of words of L-bit are formed, wherein cross-correlation between two adjacent words used for frame synchronization is zero at zero time shift or cross-correlation between a word used for frame synchronization and a word used for channel estimation is zero at all time shifts.

The present invention can be achieved in a whole or in parts by a correlator circuit for at least one of a user equipment and a base station, comprising: a plurality of latch circuits, each latch circuit latching a word formed by a pilot bit from a plurality of slots; a plurality of correlators, each correlator coupled to a corresponding latch circuit and correlating the word to a set of prescribed values; and a combiner that combines the set from each correlator such that maximum peak values of equal in magnitude and opposite in polarity are formed at zero and middle time shifts.

The present invention can be achieved in a whole or in parts by a communication device comprising: means for transmitting at least one of data and control information; means for receiving at least one of data and control information, wherein the receiving means includes: a plurality of latch circuits, each latch circuit latching a word formed by a pilot bit from a plurality of slots; a plurality of correlators, each correlator coupled to a corresponding latch circuit and correlating the word to a set of prescribed values; a plurality of buffers, each buffer coupled to a corresponding correlator to store the set of prescribed values; and a combiner that combines the set from each buffer such that maximum peaks of equal in magnitude and opposite in polarity are formed at zero and middle time shifts.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 12A is a table illustrating the frame synchronization words $C_1$ to $C_{i-th}$ in accordance with a preferred embodiment of the present invention;

FIG. 12B is a table illustrating the autocorrelation function of the sequences of pilot bits;

FIGS. 14A and 14B are tables illustrating the pilot patterns in accordance with a preferred embodiment of the present invention for uplink DPCCH;

FIG. 14C is a table illustrating the mapping relationship between the 8 synchronization words $C_1$–$C_8$ of FIG. 12A and shaded pilot bit patterns of FIGS. 14A and 14B;

FIG. 14E is a table illustrating the correlation results at points $A_1$–$A_4$, and the summing of the correlation results at point B of FIG. 14D.

FIG. 14F is a table illustrating various results of the addition of correlation results based on the uplink pilot patterns of the frame synchronization words in accordance with the preferred embodiment of the present invention;

FIG. 15A illustrates the pilot symbol patterns for downlink DPCH;

FIG. 15B illustrates the mapping relationship between the 8 frame synchronization words of FIG. 12A, and shaded pilot symbol pattern of FIG. 15A;

FIG. 16A illustrates pilot symbol pattern of PCCPCH;

FIG. 16B illustrates the mapping relationship between the synchronization words $C_1$–$C_8$ of FIG. 12A, and the shaded pilot symbol patterns of FIG. 16A;

FIG. 16C illustrates pilot symbol pattern of SCCHPCH;

FIG. 16D illustrates the mapping relationship between the synchronization words $C_1$–$C_8$ of FIG. 12A, and the shaded pilot symbol patterns of FIG. 16C;

FIG. 19A illustrates pilot symbol patterns of downlink DPCH for the diversity antenna using a space time block coding based transmit diversity (STTD);

FIG. 19B illustrates the mapping relationship between the 8 words $C_1$–$C_8$ of FIG. 12A and shaded pilot symbol patterns of FIG. 19A;

FIG. 19C illustrates the diversity antenna pilot symbol pattern for PCCPCH;

FIG. 19D illustrates the mapping relationship between the words $C_1$–$C_8$ of FIG. 12A and shadowed pilot symbol patterns of FIG. 19C;

FIG. 19E illustrates the pilot symbol pattern for the diversity antenna when STTD encoding is used on the SCCPCH;

FIG. 19F illustrates the mapping relationship between the words $C_1$–$C_8$ of FIG. 12A and shaded pilot symbol patterns of FIG. 19E;

FIG. 20A is a table illustrating frame synchronization words $C_1$–$C_6$ (i=16) and autocorrelated function in accordance with another preferred embodiment of the present invention;

FIG. 20B is a table illustrating the autocorrelation function of the pilot bits of each frame synchronization word classified in the PCSP;

FIG. 20C illustrates the pilot bit pattern of uplink DPCCH;

FIG. 20D illustrates a mapping relationship between the alternative frame synchronization words $C_1$–$C_{16}$ of FIG. 20A and the shaded frame synchronization words of FIG. 20C;

FIGS. 20E and 20F illustrate the pilot symbol pattern of downlink DPCH;

FIG. 20G illustrates a mapping relationship between the alternative frame synchronization words $C_1$–$C_{16}$ of FIG. 20A and the shaded frame synchronization words of FIGS. 20E and 20F;

FIG. 20H illustrates the pilot symbol pattern of downlink PCCPCH; and

FIG. 20I illustrates a mapping relationship between the alternative frame synchronization words $C_1$–$C_{16}$ of FIG. 20A and the shaded frame synchronization words of FIG. 20H.

DETAILED DESCRIPTION OF PREFERRED EMBODIMENTS

Figure 1:
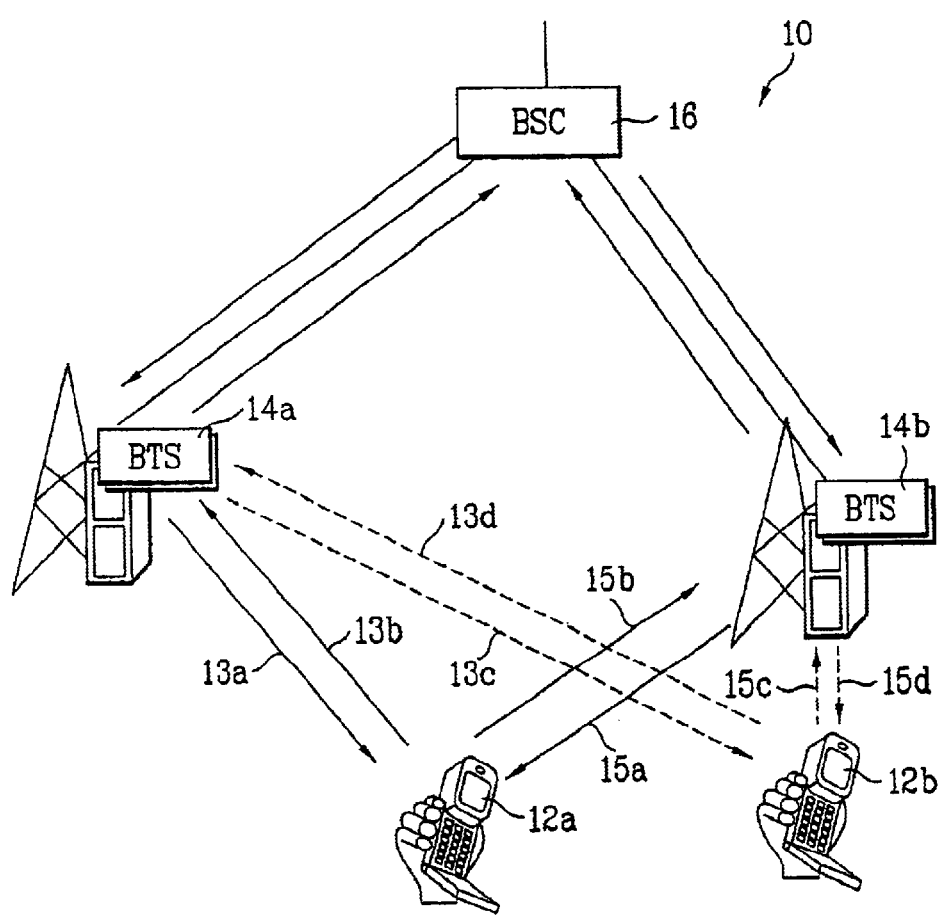
FIG. 1 generally illustrates a system, which uses CDMA modulation techniques in communication between user and base stations.
Figure 2:
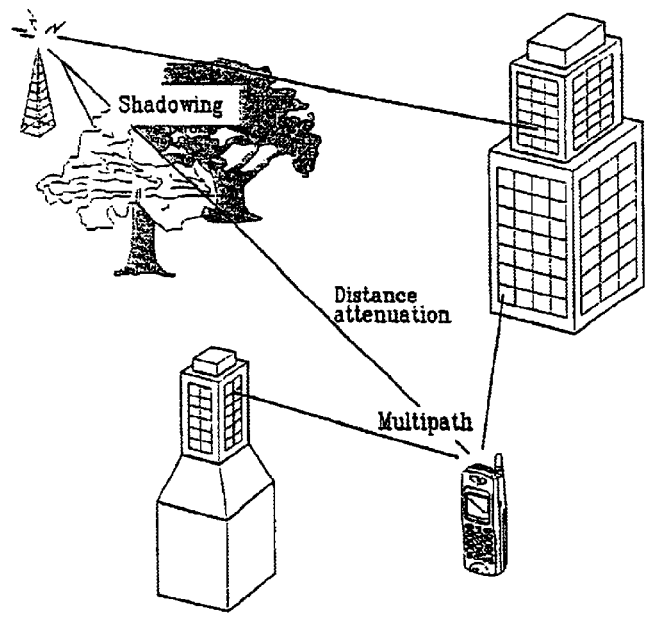
FIG. 2 illustrates these three different propagation phenomena.
Figure 3:
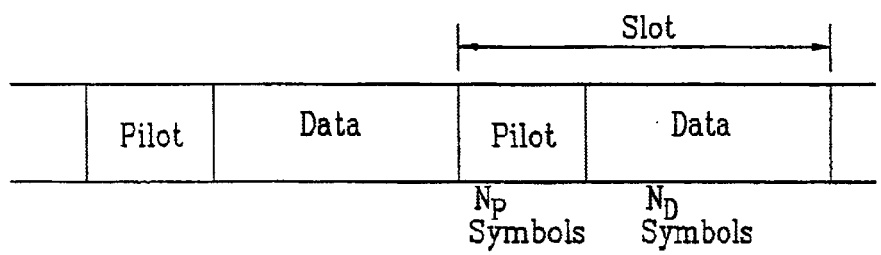
FIG. 3 depicts a block diagram of a transmitter and a receiver for time multiplexed pilot symbols.
Figure 3:
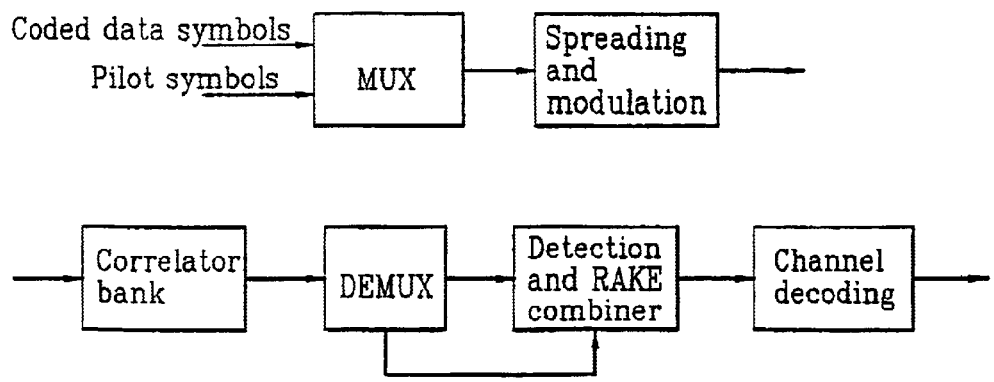
Figures 4, 5:
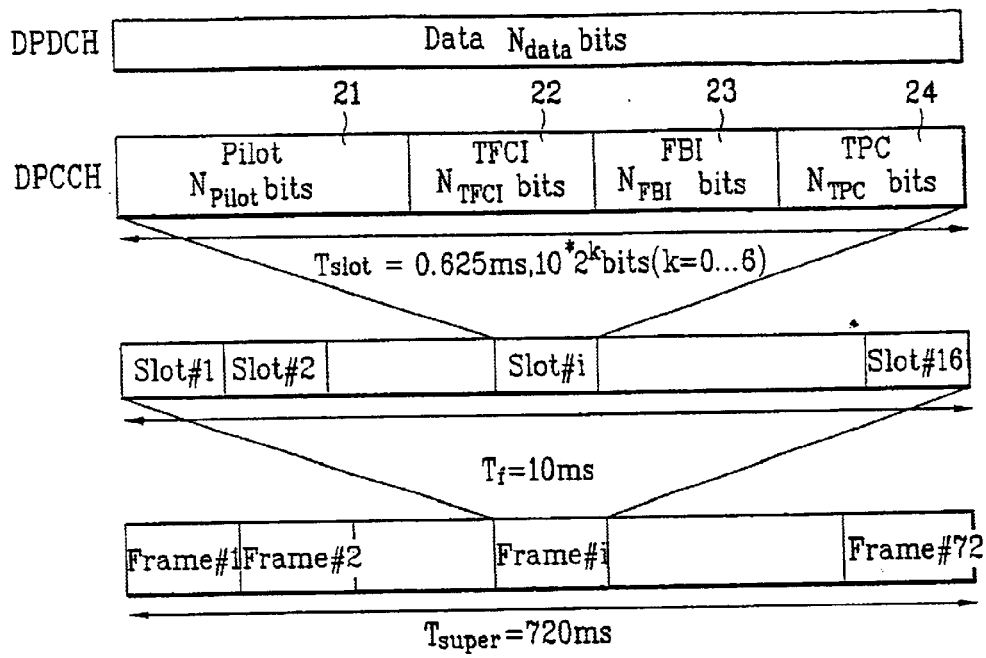
FIG. 4 illustrates a frame structure of an uplink DPCH based on the 3GPP RAN standard.
FIG. 5 is a table showing various information of the uplink DPCCH.
Figures 6, 7:
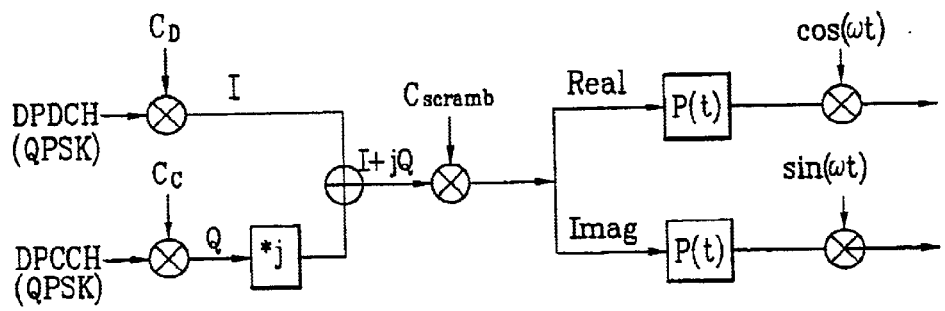
FIG. 6 is a table illustrating pilot bit patterns of the uplink DPCCH.
FIG. 7 shows a spreading/scrambling arrangement for the uplink DPCH based on the 3GPP RAN standard.
Figures 8, 9:
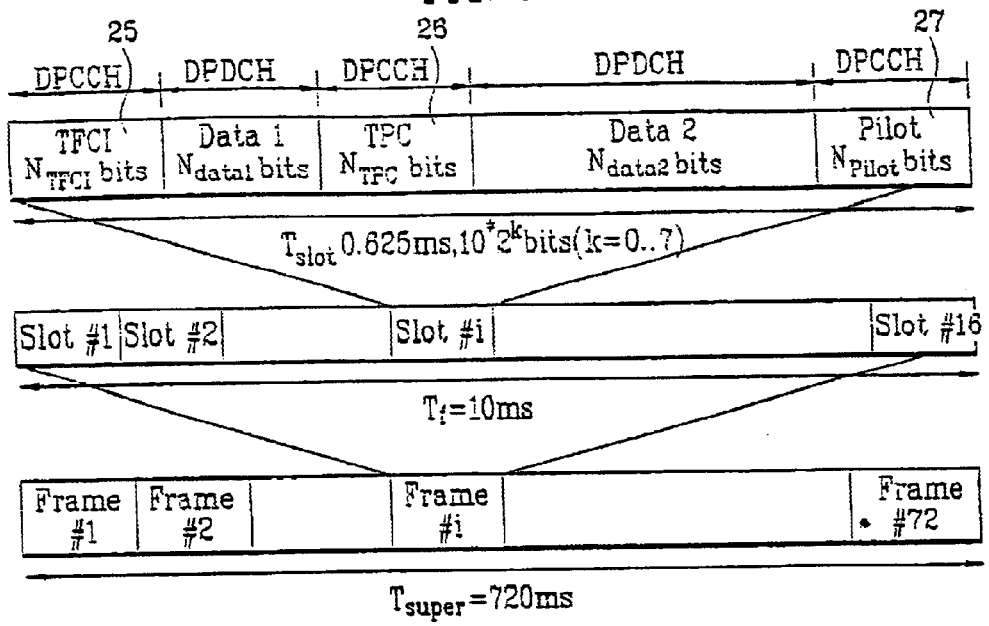
FIG. 8 illustrates a frame structure of a downlink DPCH based on the 3GPP RAN standard.
FIG. 9 is a table illustrating pilot symbol patterns contained in the downlink DPCCH.
Figure 10:
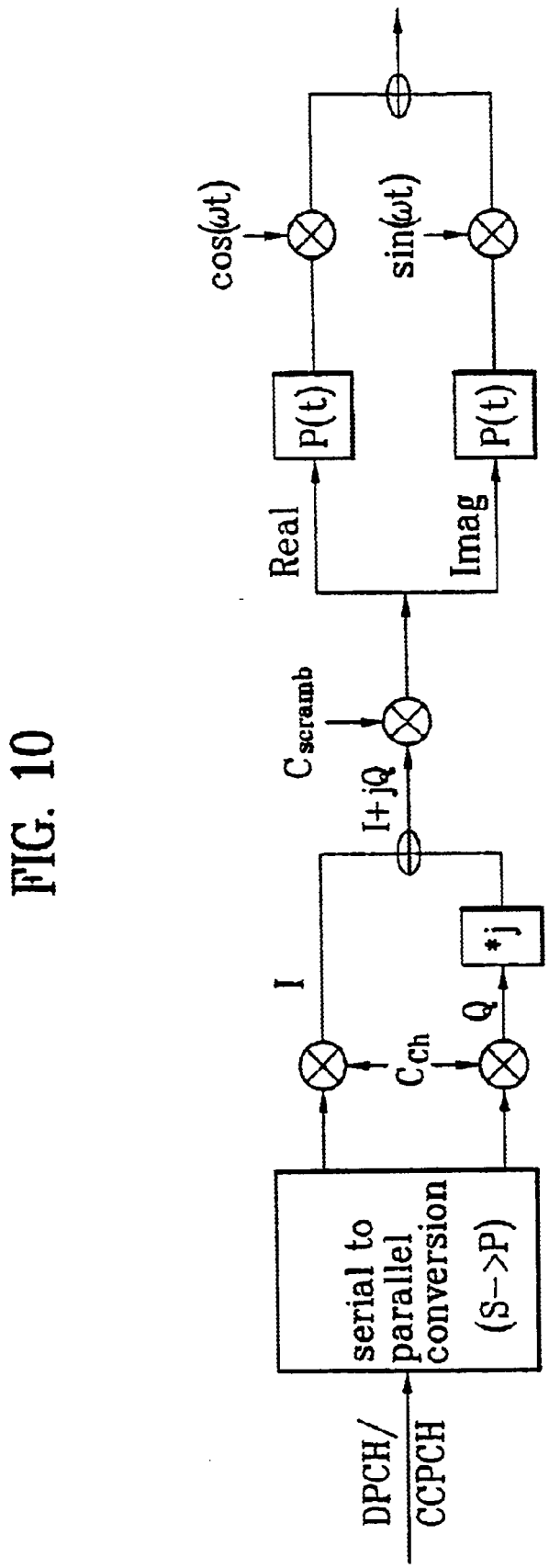
FIG. 10 illustrates a spreading/scrambling arrangement for the downlink DPCH based on the 3GPP RAN standard.
Figure 11A:
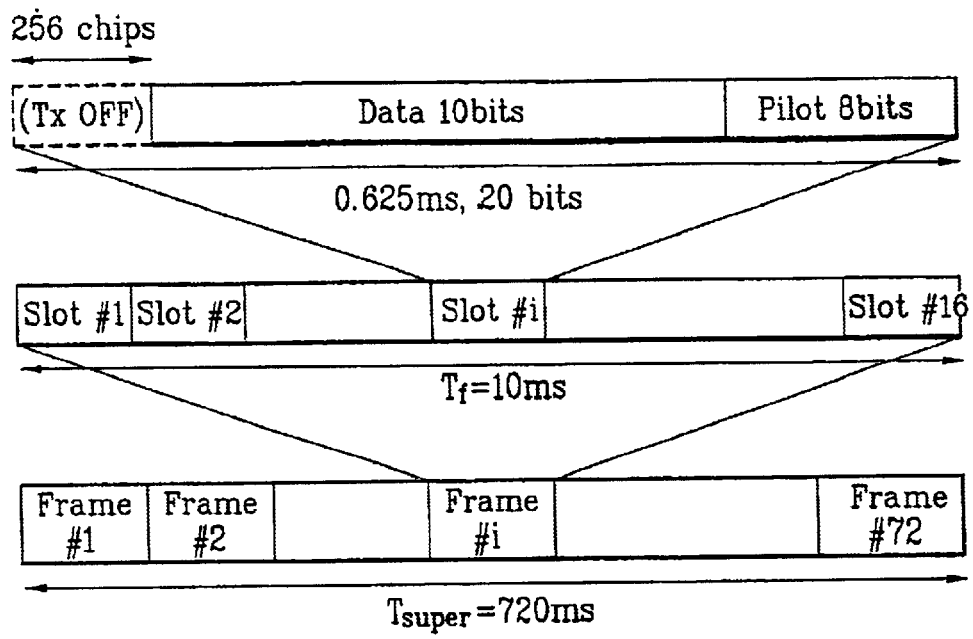
FIGS. 11A and 11B illustrate the frame structure of PCCPCH and SCCPCH, respectively.
Figure 11B:
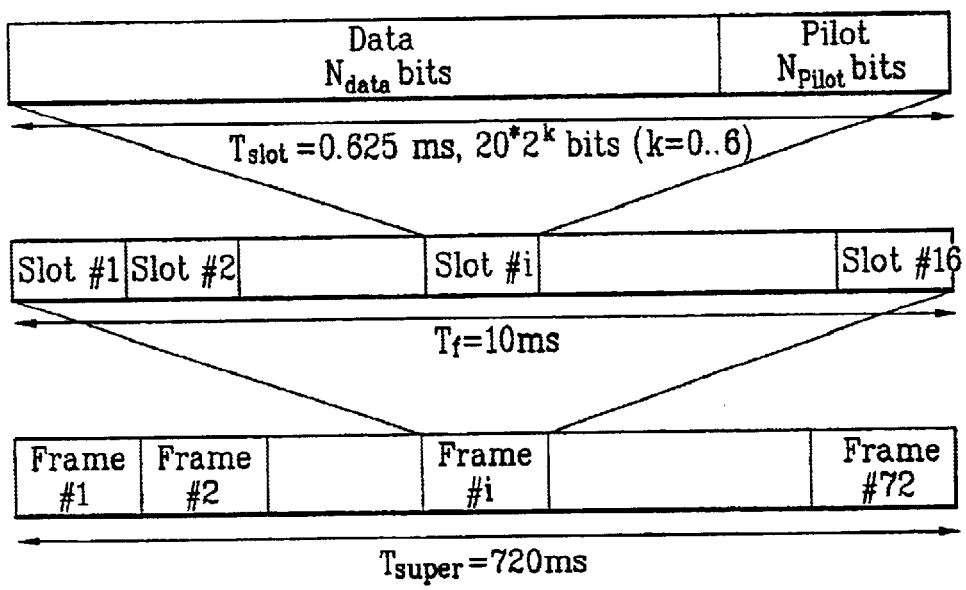

The new frame synchronization words in accordance with the preferred embodiment have the lowest out-of-phase values of autocorrelation function with two peak values equal in magnitude and opposite in polarity at zero and middle shifts. The frame synchronization words are suitable for frame synchronization confirmation since by simply adding autocorrelation functions of such words, double maximum correlation values equal in magnitude and opposite polarity at zero and middle shifts can be achieved. This property can be used to double-check frame synchronization timing and reduce the synchronization search time.

The UE establishes downlink chip synchronization and frame synchronization based on the Primary CCPCH synchronization timing and the frame offset group, slot offset group notified from the network. The frame synchronization can be confirmed using the frame synchronization word. The network establishes uplink channel chip synchronization and frame synchronization based on the frame offset group and slot offset group. The frame synchronization can also be confirmed using the frame synchronization word.

When long scrambling code is used on uplink channels or downlink channels, failure in frame synchronization confirmation using frame synchronization words always means losing frame and chip synchronizations since the phase of long scrambling code repeats every frame. Whereas in the case of short scrambling code on uplink DPCCH, failure in frame synchronization confirmation does not always implies losing chip synchronization since the length of short scrambling code is 256 and it corresponds to one symbol period of uplink DPCCH with SF=256. Thus, the frame synchronization word of pilot pattern can detect synchronization status and this information can be used in RRC Connection Establishment and Release Procedures of Layer 2.

FIG. 12A is a table illustrating the frame synchronization words $C_1$ to $C_{i-th}$ in accordance with a preferred embodiment of the present invention, where each word comprises L number (L>1) of sequence of pilot bits from a prescribed bit position of the $N_{pilot}$ bits ($N_{pilot}$>0) from each slot of L number of slots. In the preferred first embodiment described hereinafter, the number of synchronization words i equals 8, the number of slots L=16 and the number of pilot bits $N_{pilot}$ in each slot is between 4 and 16, but the present invention is applicable to different variations of i, L, and $N_{pilot}$.

The synchronization words $C_1$–$C_8$ of the preferred embodiment can be divided into 4 classes (E-H, referred to as Preferred Correlation Sequence Pair (PCSP)) according to the autocorrelation function of the synchronization words, as follows:

$E=\{C_1, C_5\}$ $F=\{C_2, C_6\}$ $G=\{C_3, C_7\}$ $H=\{C_4, C_8\}$

FIG. 12B is a table illustrating the autocorrelation function of 1 to 16 sequences of pilot bits of each frame synchronization word classified in classes E, F, G and H within one correlation period from a time shift of 0 to 15. As shown in FIGS. 12A and 12B, each class contains 2 sequences, and sequences of the same class have the same autocorrelation function. From FIG. 12B, the synchronization words have the lowest out-of-phase values of autocorrelation function with two peak values equal in magnitude and opposite in polarity at zero and middle shifts. Moreover, the results $R_1$ and $R_2$ of the autocorrelation function are complements of each other. The following relationships between the autocorrelation functions are expressed in equations (1)–(4):

$$R_E(\tau)=R_F(\tau)=R_G(\tau)=R_H(\tau), \tau \text{ is even} \quad (1)$$

$$R_E(\tau)=-R_F(\tau), \tau \text{ is odd} \quad (2)$$

$$R_G(\tau)=-R_H(\tau), \tau \text{ is odd} \quad (3)$$

$$R_i(\tau)+R_i(\tau+8)=0, i\in\{E,F,G,H\}, \text{ for all } \tau \quad (4)$$

From equations (1), (2), and (3), the following equation is obtained.

$$R_E(\tau)+R_F(\tau)=R_G(\tau)+R_H(\tau), \text{ for all } \tau \quad (5)$$

Figure 13A:
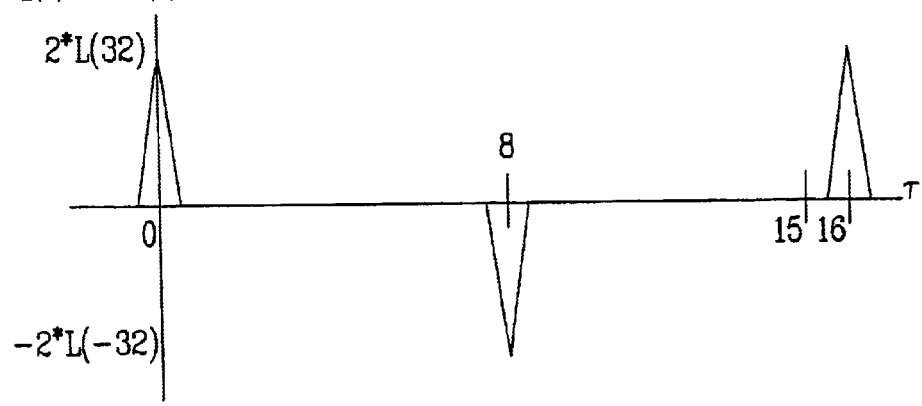
FIG. 13A illustrates addition of two autocorrelation functions.

The addition of two autocorrelation functions $R_E(\tau)$ and $R_F(\tau)$, or $R_G(\tau)$ and $R_H(\tau)$ becomes the function with two peak values equal in magnitude and opposite in polarity at zero and middle shifts, and all zero values except the zero and middle shifts, which is depicted in FIG. 13A, where the peak values equal $2*L$ or $-2*L$. In the preferred embodiment, the peak values of FIG. 13A are 32 and −32, since L=16. The other combinations such as $(R_E(\tau)+R_G(\tau))$, $(R_E(\tau)+R_H(\tau))$, $(R_F(\tau)+R_G(\tau))$, and $(R_F(\tau)+R_H(\tau))$ do not have the same value as in FIG. 13A. By using the derived properties of the frame synchronization words, the following property is achieved.

$$\sum_{i=1}^{2\alpha} R_i(\tau) = \alpha \cdot (R_E(\tau) + R_F(\tau)), 1 \le \alpha \le 4 \quad (6)$$

where $R_i(\tau)$ is the autocorrelation function of sequence $C_i$, $1 \le i \le 8$.

Figure 13B:
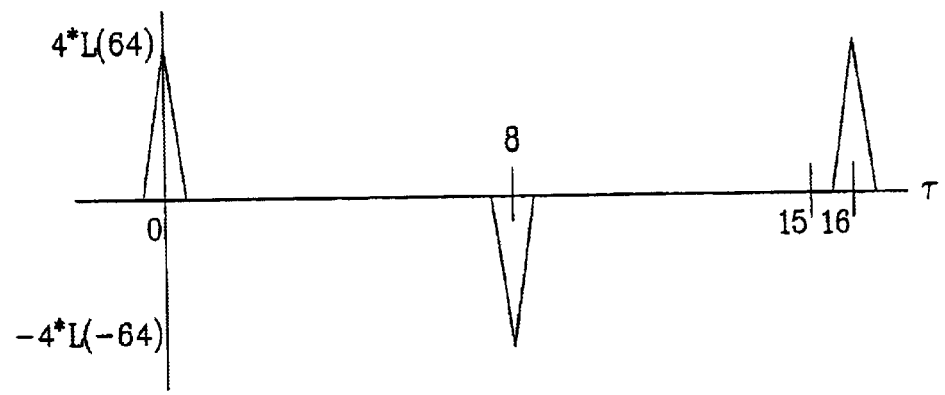
FIG. 13B illustrates addition of the four autocorrelation functions.

The addition of the four autocorrelation functions is illustrated in FIG. 13B, which is the same as FIG. 13B except that the maximum value is doubled to $4*L$ or $-4*L$ (the maximum values being 64 and −64 for the preferred embodiment) since $(R_E(\tau)+R_F(\tau)+R_G(\tau)+R_H(\tau))=2(R_E(\tau)+R_F(\tau))$ by equations (5) and (6). This property allows the double-checking of the frame synchronization timing and the reduction of the synchronization search time.

First Embodiment for Uplink DPCCH

FIGS. 14A and 14B are tables illustrating the pilot patterns in accordance with a preferred embodiment of the present invention for uplink DPCCH with $N_{pilot}$=5, 6, 7, and 8. The shaded pattern of FIGS. 14A and 14B are used for frame synchronization (which can also be used for channel estimation), and the pilot bit other than the frame synchronization words (e.g., channel estimation) has a value of 1. FIG. 14C is a table illustrating the mapping relationship between the 8 synchronization words $C_1$–$C_8$ of FIG. 12A and shaded pilot bit patterns of FIGS. 14A and 14B, where frame synchronization words $C_1$, $C_2$, $C_3$, and $C_4$ are the elements of the set {E, F, G, and H}, respectively. The results of FIGS. 13A and 13B are obtained by α=1 and 2 in equation (6), respectively, which allows a double-check of the frame synchronization timing and a reduction of the synchronization time on uplink DPCCH with $N_{pilot}$=5, 6, 7, and 8.

For example, the frame synchronization words at bit #1 ($C_1$), at bit #2 ($C_2$), at bit #4 ($C_3$) and at bit #5 ($C_4$) are used in the autocorrelation process for the frame synchronization when $N_{pilot}$=6. For $N_{pilot}$=8, the frame synchronization words at bit #1 ($C_1$), at bit #3 ($C_2$), at bit #5 ($C_3$) and at bit #7 ($C_4$) are used in the autocorrelation process for the frame synchronization. For $N_{pilot}$=5, 6, 7, and 8 in each slot, a total of four frame synchronization words are used. As a result, since one radio frame has sixteen timeslots, the number of pilot bits used for the frame synchronization is only 64 per frame in the preferred embodiment. As can be appreciated, the number of words used for frame synchronization can vary depending on variations of $N_{pilot}$. For example, when $N_{pilot}$=1, one of the frame synchronization words $C_1$–$C_8$ can be used for both frame synchronization and channel estimation due to the novel feature of the preferred embodiment.

Figure 14D:
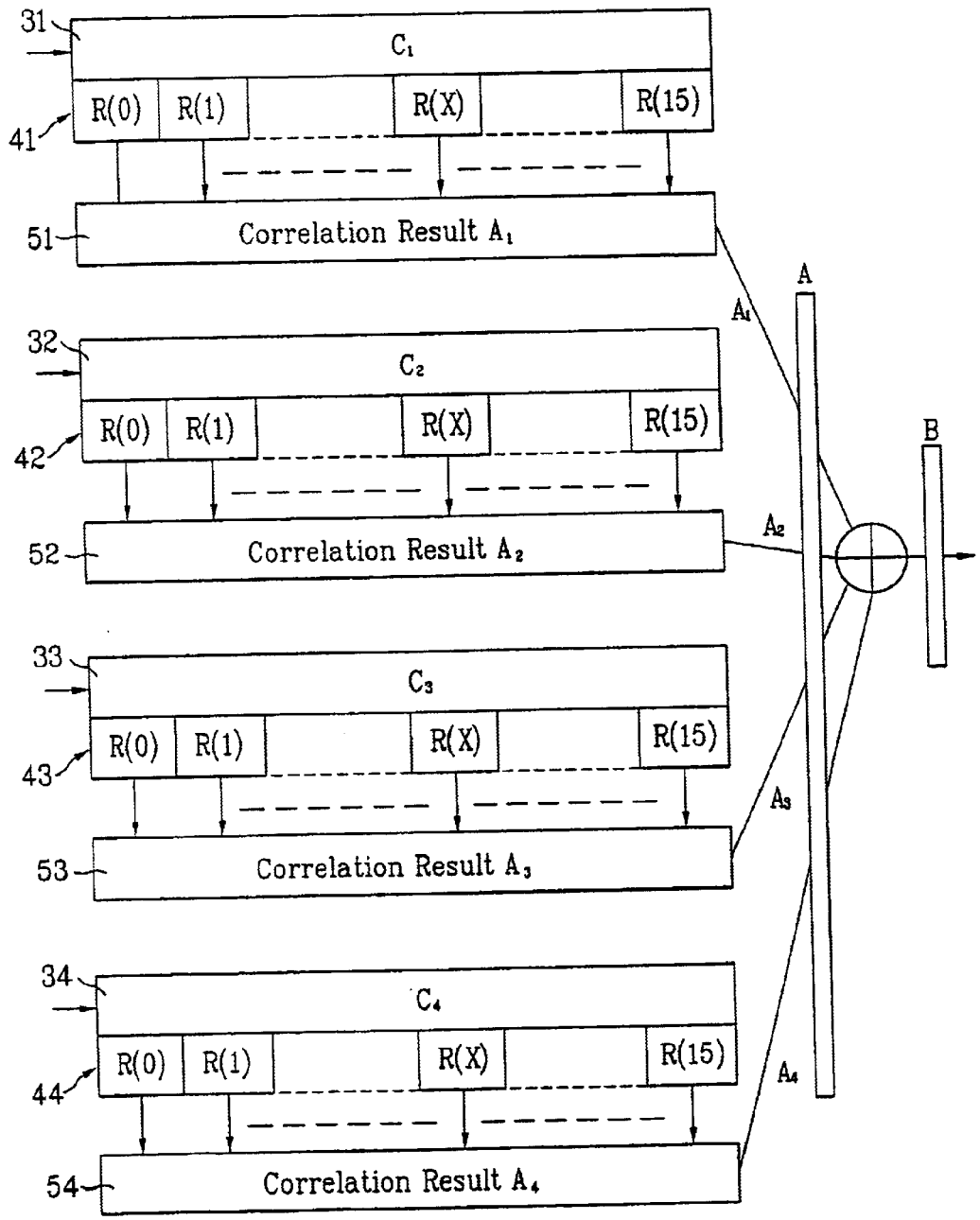
FIG. 14D illustrates a correlation circuit for frame synchronization based on pilot bits of the uplink DPCCH in accordance with a preferred embodiment of the present invention.

FIG. 14D illustrates a correlation circuit for frame synchronization based on pilot bits of the uplink DPCCH in accordance with a preferred embodiment of the present invention when frame synchronization words $C_1$–$C_4$ are used. The frame synchronization words $C_1$–$C_4$ are latched in latch circuits 31–34, respectively. The correlators 41–44 perform correlation function R(x), where x=0 to L-1, of the frame synchronization words $C_1$–$C_4$, respectively, to generate the correlation results $A_1$–$A_4$, which are stored in buffers 51–53.

FIG. 14E is a table illustrating the correlation results at points $A_1$–$A_4$, and the summing of the correlation results at point B. As shown, the result has maximum values of opposite polarity at zero and middle time shifts R(0) and R(8). Further, the remaining sidelobes at time shifts other than zero and middle have values of zero after the addition at point B. The sidelobes are eliminated or minimized, and the results at point B correspond to the optimal results of FIG. 13B.

FIG. 14F is a table illustrating various results of the addition of correlation results of points $A_1$–$A_4$ based on the uplink pilot patterns of the frame synchronization words $C_1$–$C_4$ in accordance with the preferred embodiment of the present invention. The respective addition of the autocorrelation results of points ($A_1$+$A_2$), ($A_3$+$A_4$), ($A_1$+$A_4$) and ($A_2$+$A_3$) exhibit the same characteristics of the optimal results illustrated in FIG. 13A.

Figure 14G:
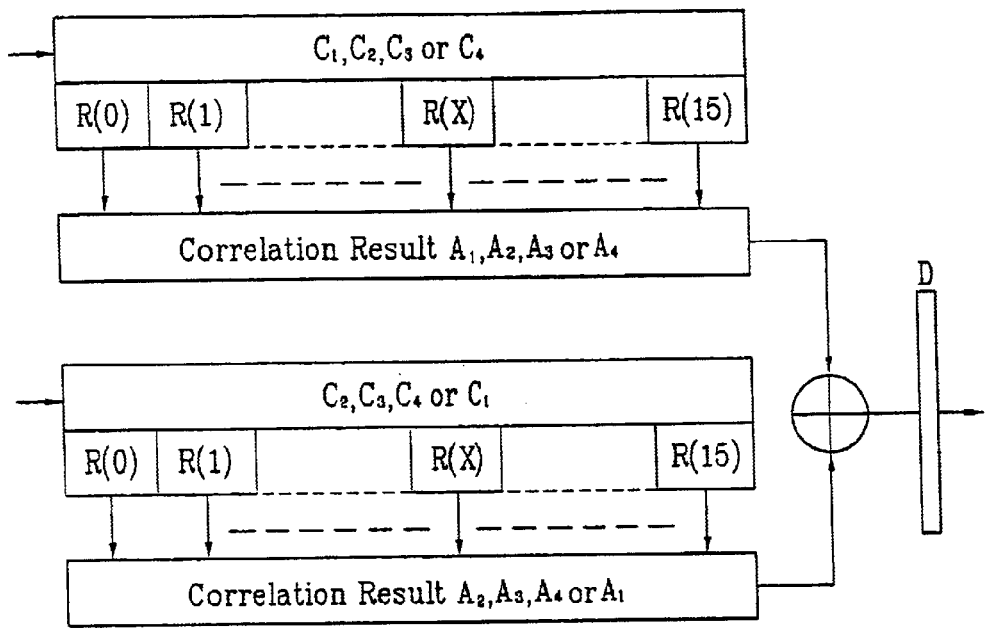
FIG. 14G illustrates a correlator circuit for frame synchronization based on pilot bit sequences of an uplink DPCCH in accordance with an alternative embodiment.

FIG. 14G illustrates a correlator circuit for frame synchronization based on pilot bit sequences of an uplink DPCCH in accordance with an alternative embodiment. The elements are the same as the correlator circuit of FIG. 14D. The frame synchronization words of ($C_1$ and $C_2$), ($C_2$ and $C_3$), ($C_3$ and $C_4$), or ($C_4$ and $C_1$) are correlated and summed to provide the results at point D. The summation result at point D of FIG. 14G is similar to the correlator circuit of FIG. 14D other than the maximum values of opposite polarity being 2*L (32) and -2*L (-32), rather than 4*L (64) and -4*L (-64), respectively corresponding to the results of FIG. 14F and optimal results of FIG. 13A.

Figure 14H:
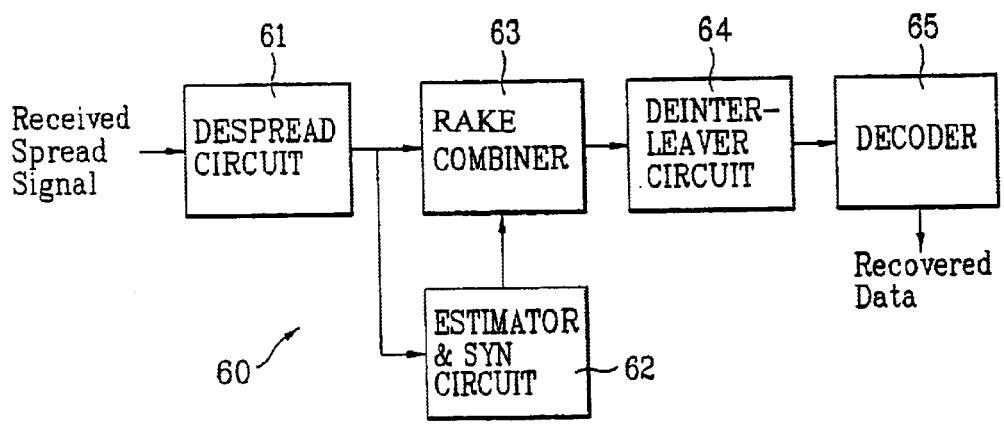
FIG. 14H illustrates the receiver circuit of a base station or a user equipment to recover the received spread signal including the frame synchronization words in the pilot field.

FIG. 14H illustrates the receiver circuit 60 of a base station or a user equipment to recover the received spread signal including the frame synchronization words in the pilot field. After despreading the received spread signal by the despreading circuit 61, the channel estimator and frame synchronizer 62 performs the channel estimation and the frame synchronization based on the pilot field. The Rake combiner 63 uses the results of the channel estimator and frame synchronizer, and after rake combining, the data is deinterleaved by the deinterleaving circuit 64 in the reverse order of the transmitter side. Thereafter, the data is recovered after decoding by a decoder 65.

Figures 14I, 14J:
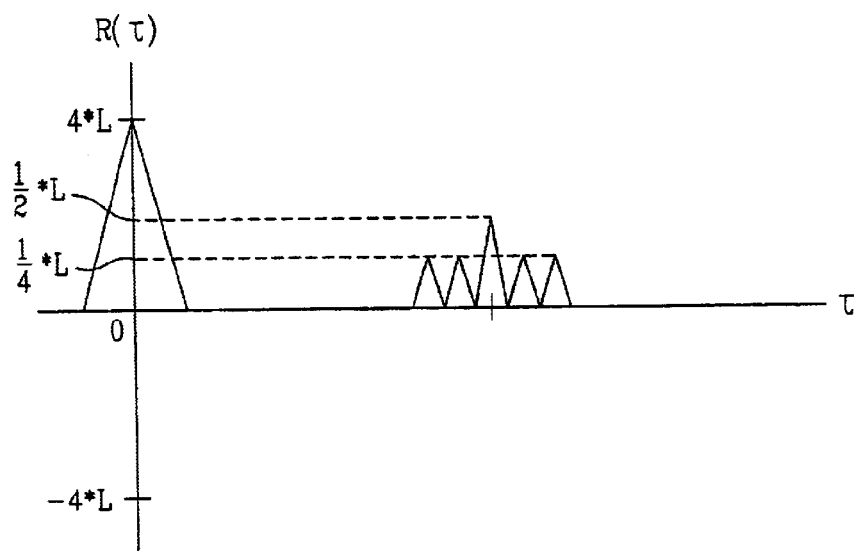
FIG. 14I illustrates results of correlation circuit using the pilot pattern of the technical specification.
FIG. 14J illustrates a time shift graph of the summation of results of FIG. 14I.

The advantages of the present invention can be readily discerned based on comparison of the frame synchronization words previously recommended in TS S1.11 v1.1.0 specification and the frame synchronization words for, e.g., $N_{pilot}$=6. Applying the same principle of equations (1)–(6) and the correlator circuit of FIG. 14D, the results in FIG. 14I are obtained for the pilot pattern indicated in the technical specification. When the summation result at point B is mapped on a time shift graph, the problem of sidelobes is readily apparent, as shown in FIG. 14J. In other words, there is no maximum peak values of opposite polarity at zero and middle time shifts, and sidelobes are present at time shifts other than zero and middle.

As described in the background art, obtaining good cross-correlation and autocorrelation simultaneous is difficult to achieve, where cross-correlation relates to different words at different time shifts and autocorrelation relates to same sequences which are time shifted version. The good cross-correlation and autocorrelation of the present invention is based on unique properties of the frame synchronization words.

The unique characteristics of the frame synchronization words in accordance with the preferred embodiment can be readily discerned in view of FIGS. 12, 14A and 14B. As shown in frame synchronization words $C_1$–$C_8$ of FIG. 12, each word has substantially the same number of 1 and 0. In other words, the number ($b_1$) of pilot bits of a frame synchronization words having a value of 1 minus the number ($b_0$) of pilot bits of the frame synchronization having a value of 0 is equal to zero or close to zero. In the preferred embodiment, when there are even number of slot numbers, there are the same number of pilot bits having a value of 1 and 0 in a single frame synchronization word such that $b_1$–$b_0$ is zero. As can be appreciated, when there are an odd number of pilot bits in a single frame synchronization word, the result of $b_1$–$b_0$ is plus or minus one, e.g., close to zero.

The second characteristic of the frame synchronization words can be discerned by an examination between a pair of adjacent frame synchronization words (shaded patterns of FIGS. 14A and 14B for $N_{pilot}$=5, 6, and 7), or between a pair of adjacent frame synchronization word and channel estimation word (shaded and non-shaded patterns of FIGS. 14A and 14B for $N_{pilot}$=5, 6, 7, and 8). Generally, the number ($b_3$) of bit values which are the same (0, 0 and 1,1) between a pair of adjacent words (i.e., between two adjacent frame synchronization words, or between a frame synchronization word and a channel estimation word, which are adjacent) minus the number ($b_4$) of bit values which are different (1,0 or 0,1) between adjacent words (i.e., between two adjacent frame synchronization words, or between a frame synchronization word and a channel estimation word, which are adjacent) equals zero or a prescribed number close to zero.

In the preferred embodiment, the number ($b_3$) of pilot bit values which are the same between two adjacent words equals the number ($b_4$) of pilot bit value which are different between the two adjacent words, i.e., $b_3-b_4=0$. In the preferred embodiment, when the $N_{pilot}=5$, between two synchronization words of $C_1$ at bit #0 and $C_2$ at bit #1, there same number of pilot bit values which are the same (0,0 and 1,1) and pilot bit values which are different (1,0 and 0,1) from slot #1 to slot #16, as shown in FIG. 14A. Similarly, between a synchronization word $C_2$ at bit #1 and a channel estimation word at bit #2, there same number of pilot bit values which are the same (0,0 and 1,1) and pilot bit values which are different (1,0 and 0,1) from slot #1 to slot #16. The same applies between two adjacent words at bit #2 and bit #3, and between two adjacent words at bit #3 and bit #4. The above also applies to adjacent words of $N_{pilot}=6$, 7 and 8. As can be appreciated, when an odd number of slots are used, the result of $b_3-b_4$ equals plus or minus one, e.g., close to zero.

As a result of such a characteristic, cross-correlation between two adjacent words used for frame synchronization is zero (orthogonal) at zero time shift. Further, the cross-correlation between a word used for frame synchronization and the sequence used for channel estimation is zero (orthogonal) at all time shifts. In other word, within $N_{pilot}$ number of words of L-bits, there are an even number of words used for frame synchronization, but all words perform channel estimation, wherein between adjacent words used for frame synchronization, there is substantially zero cross-correlation. Moreover, the words used for frame synchronization has substantially zero cross-correlation with words not used for frame synchronization, i.e., channel estimation, at any time shifts.

Further, each $N_{pilot}$ words corresponds to a prescribed number by an autocorrelation function such that when a pair from a set of autocorrelated results corresponding to words used for frame synchronization is combined, two peak values equal in magnitude and opposite in polarity are achieved at zero and middle time shift while sidelobes are substantially eliminated at time shifts other than zero and middle. Autocorrelation in accordance with the present invention can be generally defined as a correlation between a word and its time shifted replica (including replica at zero time shift), where correlation is the number of bit values which are the same between two words minus the number of bit values which are different between the same two words. Further, as shown in FIG. 12B, $R_1$ and $R_2$ are complements of each other.

First Embodiment for Downlink DPCH

FIG. 15A illustrates the pilot symbol patterns for downlink DPCH for $N_{pilot}=4$, 8 and 16, where two pilot bits form a symbol since the right bit is used for the I channel branch and the left bit is used for the Q channel branch. In the preferred embodiment, $N_{pilot}=4$ can be used for 8 ksps (kilo symbols per second); $N_{pilot}=8$ can be used for 16, 32, 64, and 128 ksps; and $N_{pilot}=16$ can be used for 256, 512, and 1024 ksps. The shaded symbols of FIG. 15A can be used for frame synchronization, and the value of pilot symbol other than for frame synchronization word, e.g., channel estimation (channel estimation word), is 11. The results of FIG. 15A is obtained by allowing $\alpha=1$ for $N_{pilot}=4$, $\alpha=2$ for $N_{pilot}=8$, and $\alpha=4$ for $N_{pilot}=16$ in equation (6) for downlink DPCH.

FIG. 15B illustrates the mapping relationship between the 8 frame synchronization words of FIG. 12A, and shaded pilot symbol pattern of FIG. 15A. For example, in the preferred embodiment of $N_{pilot}=4$, the symbol #1 includes two frame synchronization words of $C_1$ (for the I channel branch I-CH, i.e., left sequence of bits from slot #1 to slot #16) and $C_2$ (for the Q channel branch Q-CH, i.e., right sequence of bits from slot #1 to slot #16). For $N_{pilot}=8$ and $N_{pilot}=16$, the correspondence of words to channels for corresponding symbols is self-explanatory in FIG. 15B. Similar to the uplink DPCCH, slot-by-slot double-check of the frame synchronization timing and a reduction of the frame synchronization search time can be achieved by using the autocorrelation property of the pilot symbol pattern based on equation (6).

Because the frame synchronization words of the downlink DPCH is based on frame synchronization words of FIG. 12A, the characteristics described for uplink DPCCH is applicable to downlink DPCH. For example, the number ($b_3$) of bit values which are the same (0,0 and 1,1) between adjacent words (i.e., between synchronization word of I channel branch and synchronization word of Q channel branch of a frame synchronization symbol, or between a channel estimation word of the Q channel branch and a frame synchronization word of the I channel branch, which are adjacent, or between a frame synchronization word of the Q channel branch and a channel estimation word of the I channel branch, which are adjacent) minus the number ($b_4$) of bit values which are different (1,0 and 0,1) between adjacent words (i.e., between synchronization word of I channel branch and synchronization word of Q channel branch of a frame synchronization symbol, or between a channel estimation word of the Q channel branch and a frame synchronization word of the I channel branch, which are adjacent, or between a frame synchronization word of the Q channel branch and a channel estimation word of the I channel branch, which are adjacent) equals zero or a prescribed number close to zero.

For example, for $N_{pilot}=8$, between the symbols #0 and #1, the number of a pair of adjacent bits, i.e., one bit from the Q channel branch of the symbol #0 and one bit from the I channel branch of the symbol #1, having bit values of 1,1 and 0,0 is the same as the number of adjacent bits having bit values of 1,0 and 0,1. In other words, $b_3-b_4=0$. As can be appreciated, if the number of slots L is an odd number, the result of $b_3-b_4$ is plus or minus one, e.g., a prescribed number close to zero.

Figure 15C:
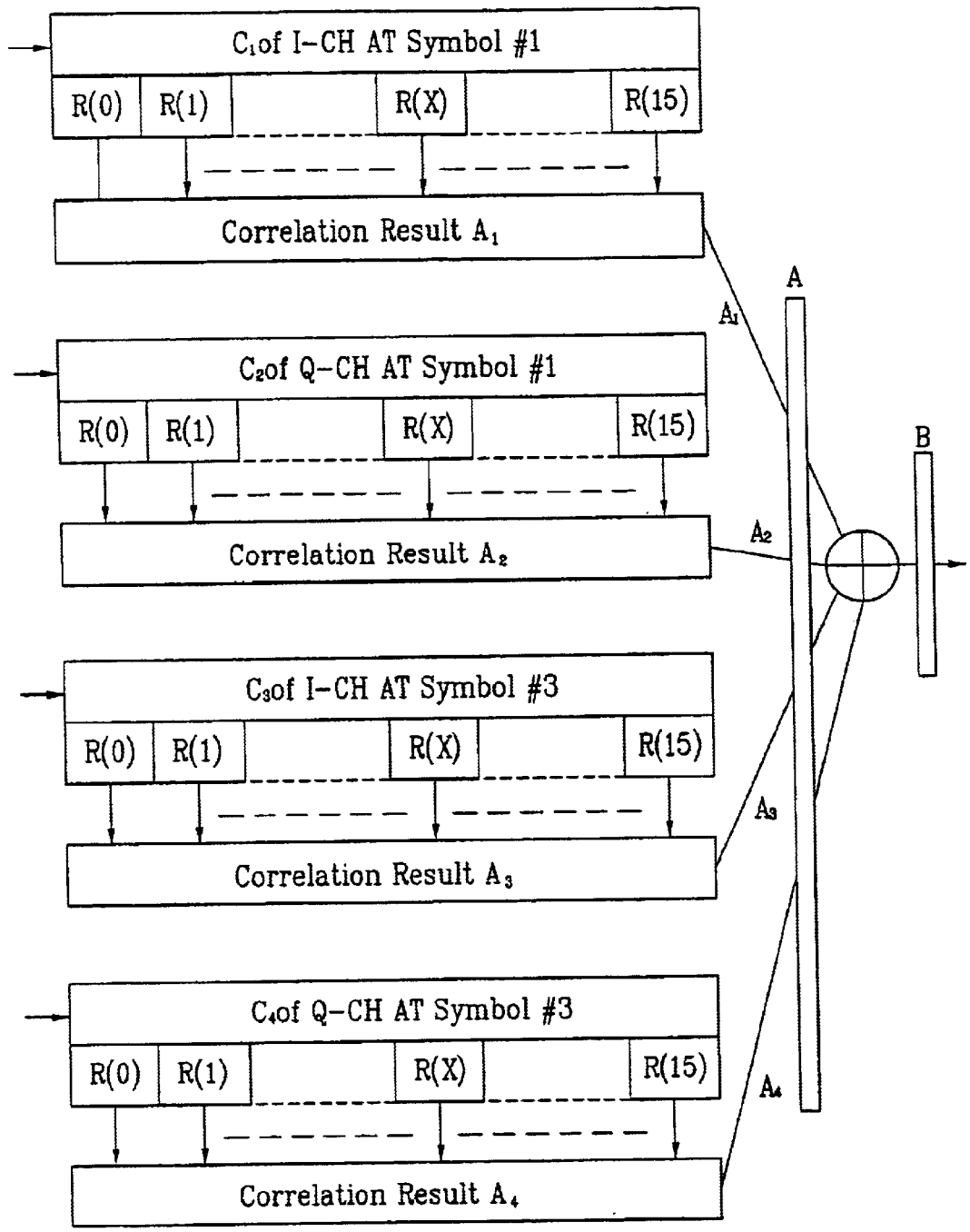
FIG. 15C illustrates a correlation circuit for frame synchronization for downlink DPCCH in accordance with the preferred embodiment.

FIG. 15C illustrates a correlation circuit for frame synchronization for downlink DPCCH of $N_{pilot}=8$ in accordance with the preferred embodiment. The operation and components are the same as the correlation circuit of FIG. 14D for uplink DPCCH, except for the reception of I channel branch and Q channel branch synchronization words. The results of points $A_1-A_4$ and point B is the same as FIG. 14E. Similarly, the sidelobes are eliminated or minimized, and the results correspond to the optimal results of FIG. 13B. Because the number of pilot symbols (or pilot bits) used for the frame synchronization is 2 symbols per slot (or 4 bit per slot), 32 pilot symbols (or 64 pilot bits) are used in each radio frame for the frame synchronization.

For $N_{pilot}=4$ in the downlink DPCCH, the correlator circuit of FIG. 14G can be used. In such a case, the I and Q channel frame synchronization words are inputted to the correlator circuit. The summation result would be the same as FIG. 14F, which corresponds to the optimal results of FIG. 13A. In this case, the number of pilot symbols (or pilot bits) used for the frame synchronization is 1 symbol per slot (or 2 bits per slot), and 16 symbols (or 32 pilot bits) are used in each radio frame for the frame synchronization.

As per $N_{pilot}16$ in the downlink DPCCH, the correlation circuit of FIG. 15C can be expanded to accommodate the additional frame synchronization words of the I and Q channel branches of pilot symbol #5 and symbol #7. The summation result would be similar to the optimal results of FIG. 13B, but the maximum peak values of opposite polarity would be 128 (8*L) and −128 (−8*L). Further, the number of pilot symbols (or pilot bits) used for the frame synchronization is 4 symbols per slot (or 8 bits per slot), and 64 pilot symbols (or 128 pilot bits) are used in each radio frame for the frame synchronization.

First Embodiment of Downlink PCCPCH and SCCPCH

FIG. 16A illustrates pilot symbol pattern of PCCPCH. The shaded symbols can be used for frame synchronization, and the value of pilot symbol other than for frame synchronization is 11. FIG. 16B illustrates the mapping relationship between the synchronization words $C_1$–$C_8$ of FIG. 12A, and the shaded pilot symbol patterns of FIG. 16A. A double-check frame of the synchronization timing and the reduction of the synchronization search time can be achieved with $\alpha=1$ or 2 in equation (6).

FIG. 16C illustrates pilot symbol pattern of SCCPCH. The shaded symbols can be used for frame synchronization, and the value of pilot symbol other than for frame synchronization is 11. FIG. 16D illustrates the mapping relationship between the synchronization words $C_1$–$C_8$ of FIG. 12A, and the shaded pilot symbol patterns of FIG. 16C.

As shown above, the frame synchronization words of PCCPCH and SCCPCH is based on the frame synchronization words $C_1$–$C_8$, and the disclosure for the uplink DPCCH and the downlink DPCH is applicable. Hence, a detailed description regarding the various characteristics including cross-correlation and autocorrelation, operations and implements are omitted since one of ordinary skill in the art can readily appreciate the present invention based on the uplink DPCCH and downlink DPCH.

As described above, the non-shaded symbols are the pilot symbols not used for frame synchronization comprises symbols of 11, and the shaded symbols are used for frame synchronization. The frame synchronization words of the pilot pattern are used for frame synchronization confirmation, and the summation of autocorrelated values for each frame synchronization words is required. The property of summation of autocorrelated values of frame synchronization words is very important.

Figure 17A:
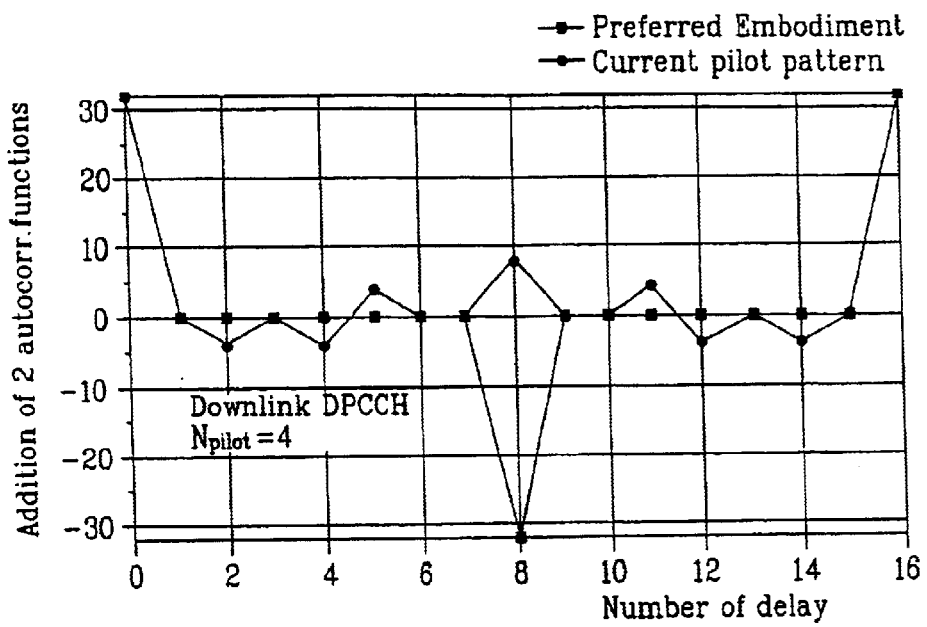
FIGS. 17A–17C illustrate addition of autocorrelation functions of frame synchronization word of the preferred embodiment and current pilot patterns (described in TS S1.11 v1.1.0 specification) for DPCHs and PCCPCH.
Figure 17B:
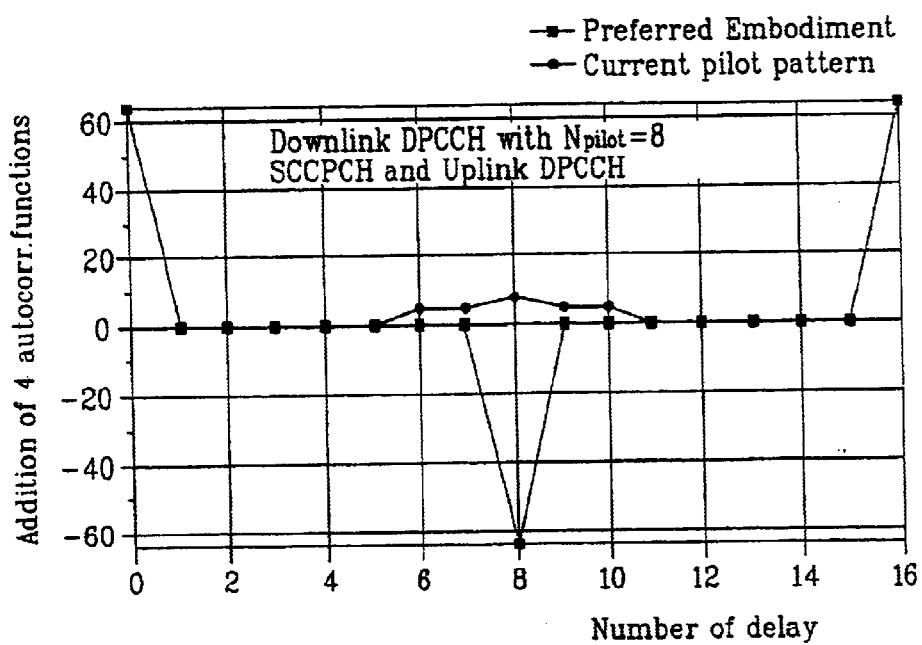
Figures 17C, 18A:
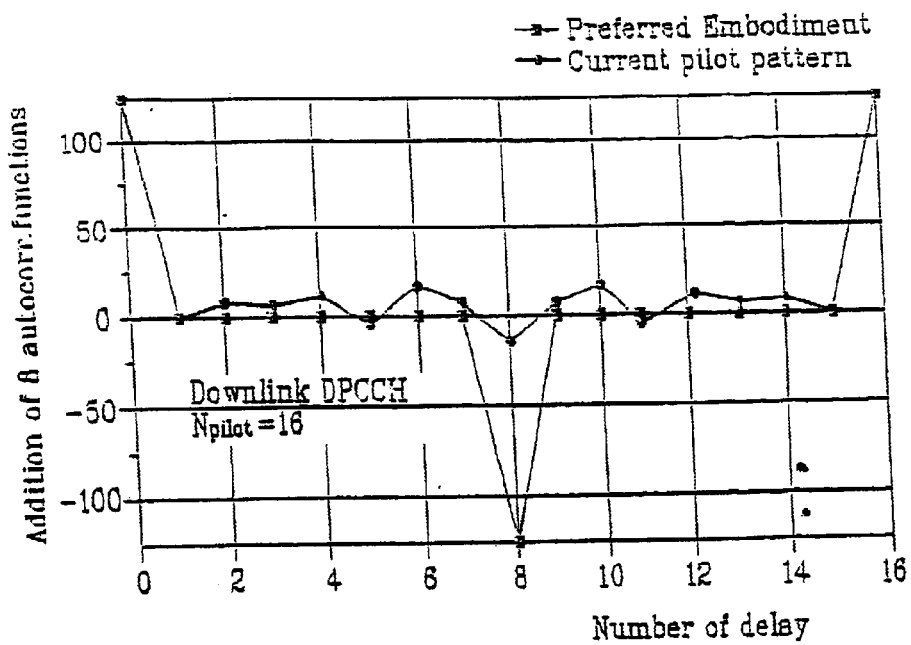
FIG. 18A illustrates the parameters used for obtaining $P_D$, $P_{FA}$, and $P_S$ on uplink DPCCH and downlink DPCH over additive white Gaussian noise (AWGN)

The addition of autocorrelation functions of frame synchronization word of the preferred embodiment and current pilot patterns (described in TS S1.11 v1.1.0 specification) for DPCHs and PCCPCH are depicted in FIGS. 17A ($N_{pilot}=$4), FIG. 17B ($N_{pilot}=8$) and FIG. 17C ($N_{pilot}=16$). As shown, the current pilot patterns have non-zero out-of-phase autocorrelation function with peak value at zero shift, whereas the frame synchronization words of the preferred embodiment have zero out-of-phase autocorrelation function with two peak values equal in magnitude and opposite in polarity at zero and middle time shifts (delays).

Correlation to a prescribed frame synchronization word is optimum method for frame synchronization. Since the frame synchronization word of pilot pattern is used for frame synchronization confirmation, the following events and parameters are used to evaluate the performance of frame synchronization confirmation using the frame synchronization words of the preferred embodiment and the current pilot patterns:

$H_1$: The event that the correlator output exceeds the predetermined threshold when the code phase offset between the received shadowed column frame synchronization word and its corresponding receiver stored frame synchronization word is zero.

$H_2$: The event that the correlator output exceeds the predetermined threshold when the code phase offset between the received shadowed column frame synchronization word and its corresponding receiver stored frame synchronization word is not zero.

$H_3$: One event of $H_1$ and no event of $H_2$ for one frame.

$H_4$: The event that the correlator output exceeds the predetermined threshold or is smaller than −1x(predetermined threshold) when the code phase offset between the received shadowed column frame synchronization word and its corresponding receiver stored frame synchronization word is 0 or 8, respectively.

$H_5$: The event that the correlator output exceeds the predetermined threshold or is smaller than −1x(predetermined threshold) when the code phase offset between the received shadowed column frame synchronization word and its corresponding receiver stored frame synchronization word is not 0 and 8.

$H_6$: One event of $H_4$ and no event of $H_5$ for one frame.

$P_D$: Probability of a detection.

$P_{FA}$: Probability of a false alarm.

$P_S$: Probability of a frame synchronization confirmation success for one frame.

From the above definitions, when the current pilot pattern is used for frame synchronization confirmation, the probability of a detection and a false alarm can be expressed as:

$$P_D = \text{Prob}(H_1) \quad (7)$$

$$P_{FA} = \text{Prob}(H_2) \quad (8)$$

The probability of a frame synchronization confirmation success for one frame becomes $P_S=\text{Prob}(H_3)$ and it can be expressed as $$P_S = P_D(1-P_{FA})^{15} \quad (9)$$

Whereas in the case of the frame synchronization words of the preferred embodiment, as has been stated, double thresholds are needed for double-check frame synchronization, and the probability of a detection and a false alarm can be expressed as:

$$P_D = \text{Prob}(H_4) \quad (10)$$

$$P_{FA} = \text{Prob}(H_5) \quad (11)$$

Similarly, in the case of frame synchronization words of the preferred embodiment, the probability of a frame confirmation success for one frame becomes $P_S=\text{Prob}(H_6)$ and it is given by $$P_S = P_D(1-P_{FA})^{14} \quad (12)$$

From equations (9) and (12), the probability of a frame synchronization confirmation is greatly affected by the probability of a false alarm since $P_S$ is proportional to $P_D$ and $(1-P_{FA})^{14}$ or $(1-P_{FA})^{15}$. For example, assume that $P_{FA}=10^{-1}$, then $(1-P_{FA})^{14}=0.2288$ and $(1-P_{FA})^{15}=0.2059$. Now let $P_{FA}=10^{-3}$, then $(1-P_{FA})^{14}=0.9861$ and $(1-P_{FA})^{15}=0.9851$. The performance of frame synchronization can be sufficiently evaluated by selecting the threshold so that the $P_{FA}$ is much smaller than $(1-P_D)$.

Figure 18B:
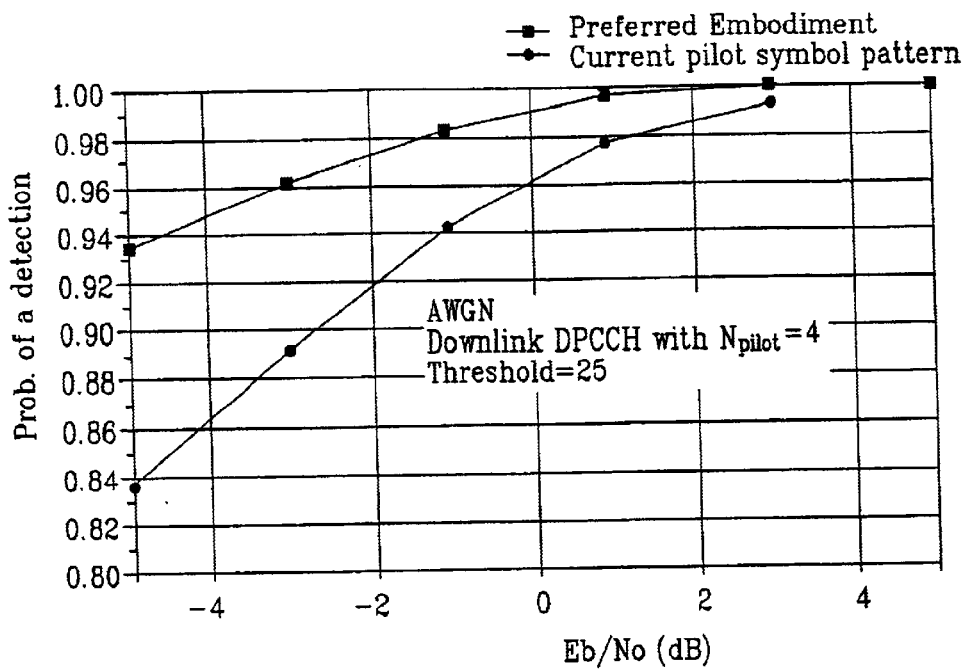
FIG. 18B illustrates the probability of detection $P_D$ on downlink DPCCH over AWGN channel.
Figure 18C:
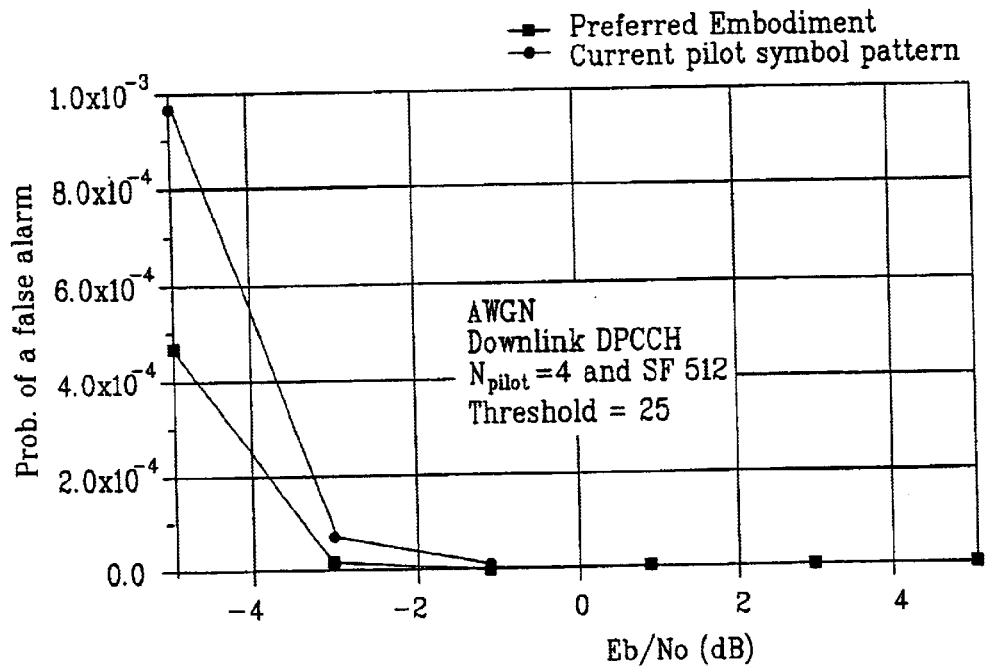
FIG. 18C illustrates the probability of false alarm $P_{FA}$ on downlink DPCCH over AWGN channel.
Figure 18D:
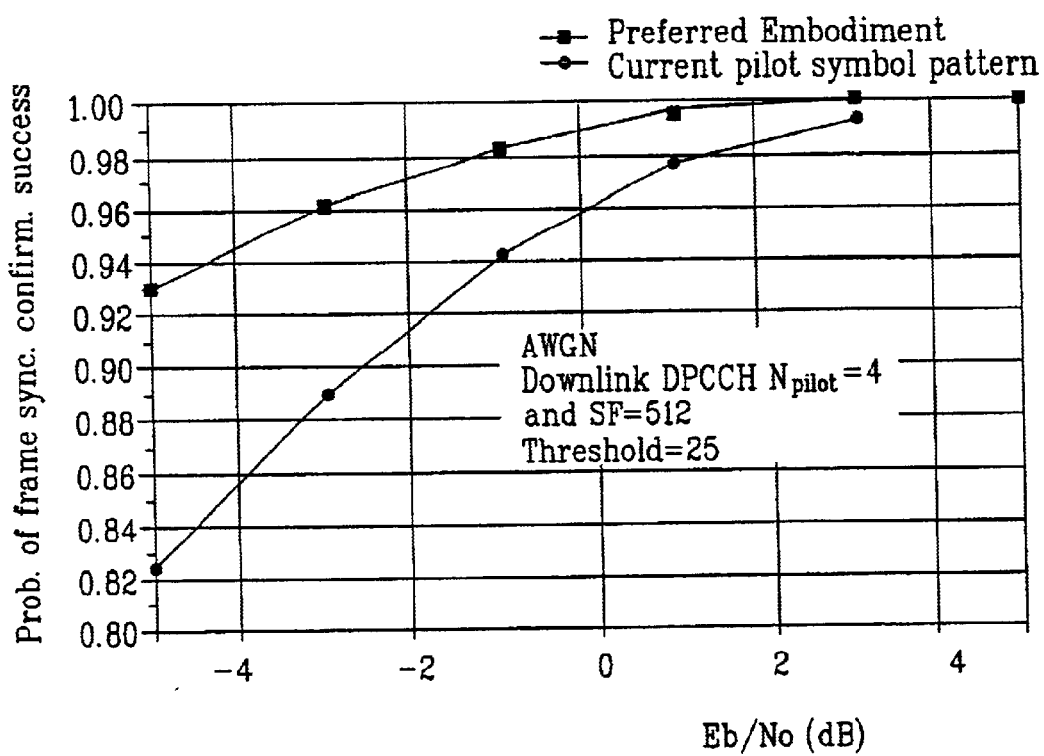
FIG. 18D illustrates the probability of a frame synchronization confirmation success $P_S$ on downlink DPCCH over AWGN channel.

The parameters of FIG. 18A are used for obtaining $P_D$, $P_{FA}$, and $P_S$ on uplink DPCCH and downlink DPCH over additive white Gaussian noise (AWGN). FIG. 18B illustrates the probability of detection $P_D$ on downlink DPCCH with $N_{pilot}=4$ over AWGN channel, FIG. 18C illustrates the probability of false alarm $P_{FA}$ on downlink DPCCH with $N_{pilot}=4$ over AWGN channel, and FIG. 18D illustrates the probability of a frame synchronization confirmation success $P_S$ on downlink DPCCH with $N_{pilot}=4$ over AWGN between the pilot pattern of the preferred embodiment and the current pilot pattern, where $P_D$, $P_{FA}$, and $P_S$ are given as a function of $E_b/N_0$ ratio ($E_b$=energy per bit, $N_0$=noise power spectral density).

The $P_D$ and $P_S$ of the pilot patterns of the preferred embodiment are greater than that of current pilot pattern. Furthermore, the $P_{FA}$ of the pilot patterns in accordance with the preferred embodiment are also smaller than that of the current pilot patterns. The theoretical equations (9) and (12) are identical to simulation results of FIG. 18D. Therefore, there is significant difference between the frame synchronization performance of pilot patterns of the preferred embodiment and that of current pilot pattern. For example, from FIG. 18D, there is 3 dB gain at $P_S=0.93$ by employing the pilot patterns of the preferred embodiment.

The frame synchronization words of the preferred embodiment are especially suitable for frame synchronization confirmation. By adding the autocorrelation functions of shaded frame synchronization words, double maximum values equal in magnitude and opposite polarity at zero and middle shifts are obtained. This property can be used to slot-by-slot and double-check frame synchronization timing and reduce the synchronization search time. The performance of frame synchronization confirmation over AWGN using pilot pattern illustrate the significant differences between the frame synchronization performance of the pilot pattern of the preferred embodiment and the current pilot pattern.

First Embodiment of Downlink DPCH, PCCPCH and SCCPH for STTD Diversity

FIG. 19A illustrates new pilot symbol patterns of Downlink DPCH for the diversity antenna using a space time block coding based transmit diversity (STTD). For the diversity pilot symbol pattern on downlink DPCH, STTD is applied to the shaded pilot symbols #1 and #3 for $N_{pilot}=8$, and the shaded pilot symbols #1, #3, #5, $N_{pilot}=16$. The non-shaded pilot symbols #0 and #2 for $N_{pilot}=8$, and non-shaded pilot symbols #0, #2, #4, and #6 for $N_{pilot}=16$ are encoded to be orthogonal to the pilot symbol of FIG. 15A. However, the diversity pilot pattern for downlink DPCH with $N_{pilot}=4$ are STTD encoded since STTD encoding requires two symbols. FIG. 19B illustrates the mapping relationship between the 8 words $C_1-C_8$ of FIG. 12A and shaded pilot symbol patterns of FIG. 19A.

FIG. 19C illustrates the new diversity antenna pilot symbol pattern for PCCPCH. The pilot symbols of FIG. 19C are encoded to be orthogonal to the pilot symbols of FIG. 16A. FIG. 19D illustrates the mapping relationship between the words $C_1-C_8$ of FIG. 12A and shadowed pilot symbol patterns of FIG. 19C.

FIG. 19E illustrates the new pilot symbol pattern for the diversity antenna when STTD encoding is used on the SCCPCH. For the diversity pilot symbol pattern on SCCPCH, STTD is applied to the shaded pilot symbols #1, and #3 of $N_{pilot}=8$, and shaded pilot symbols #1, #3, #5 and #7 of $N_{pilot}=16$ in FIG. 19E, whereas the non-shaded pilot symbols #0 and #2 of $N_{pilot}=8$, and non-shaded #0, #2, #4, #6 of $N_{pilot}=16$ are encoded to be orthogonal to those of FIG. 16C. FIG. 19F illustrates the mapping relationship between the words $C_1-C_8$ of FIG. 12A and shaded pilot symbol patterns of FIG. 19E.

Since the above is based on words $C_1-C_8$, the previous discussion regarding the uplink DPCCH and downlink DPCH, PCCPCH and SCCPH is readily applicable. One of ordinary skill in the art can readily appreciate the features for downlink using diversity antenna based on previous disclosure, and a detailed disclosure is omitted.

Alternative Embodiments for Uplink DPCCH and Downlink DPCH and PCCPCH

FIG. 20A is a table illustrating frame synchronization words $C_1-C_{16}$ (i=16) and autocorrelated function in accordance with another preferred embodiment of the present invention. The frame synchronization words $C_1-C_{16}$ can be classified into the PCSP of the first embodiment, as follows:

$E=\{C_1, C_3, C_9, C_{11}\}$ $F=\{C_2, C_4, C_{10}, C_{12}\}$ $G=\{C_5, C_7, C_{13}, C_{15}\}$ $H=\{C_6, C_8, C_{14}, C_{16}\}$

The classification of the alternative frame synchronization words $C_1-C_{16}$ are also applicable to equations (1)–(6), and have the same properties and characteristics of the first embodiment. FIG. 20B is a table illustrating the autocorrelation function of the pilot bits of each frame synchronization word classified in the PCSP. In this particular case, each class contains four sequences and the sequences of the same class have the same autocorrelation function.

FIG. 20C illustrates the pilot bit pattern of uplink DPCCH with $N_{pilot}=6$ and 8 and FIG. 20D illustrates a mapping relationship between the alternative frame synchronization words $C_1-C_{16}$ of FIG. 20A and the shaded frame synchronization words of FIG. 20C. FIGS. 20E and 20F illustrate the pilot symbol pattern of downlink DPCH with 8, 16, 32, 64, 128, 256, 512, 1024, 2048 and 4096 ksps, and FIG. 20G illustrates a mapping relationship between the alternative frame synchronization words $C_1-C_{16}$ of FIG. 20A and the shaded frame synchronization words of FIGS. 20E and 20F. FIG. 20H illustrates the pilot symbol pattern of downlink PCCPCH and FIG. 20I illustrates a mapping relationship between the alternative frame synchronization words $C_1-C_{16}$ of FIG. 20A and the shaded frame synchronization words of FIG. 20H.

Since the above is based on alternative words $C_1-C_{16}$, which have the same features as the words $C_1-C_8$ of the first embodiment, the previous discussion regarding the uplink DPCCH and downlink DPCH, PCCPCH and SCCPH of the first embodiment is readily applicable. One of ordinary skill in the art can readily appreciate the features of this embodiment based on previous disclosure, and a detailed disclosure is omitted.

The frame synchronization words of the preferred embodiment are especially suitable for frame synchronization confirmation. By adding the autocorrelation functions of shaded frame synchronization words, double maximum values equal in magnitude and opposite polarity at zero and middle shifts are obtained. This property can be used to slot-by-slot and double-check frame synchronization timing and reduce the synchronization search time. Further the present invention allows a simpler construction of the correlator circuit for a receiver, thereby reducing the complexity of the receiver. Due to various advantages of the present invention, the first preferred embodiment has been accepted by the 3GPP, as shown in TS 25.211 v2.0.1, distributed June 1999, whose entire disclosure is hereby incorporated by reference therein.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of eliminating sidelobes in a communication channel between a base station and a mobile station, comprising:

(a) generating control signals and data signals within the communication channel, said control signals having a first sequence of L-bits and a second sequence of L-bits;

(b) generating a first set of prescribed values based on the first sequence, which has a first prescribed relationship with the first set of prescribed values;

(c) generating a second set of prescribed values based on the second sequence, which has a second prescribed relationship with the second set of prescribed values; and (d) combining the first and second sets of prescribed values, wherein a result of step (d) comprise maximum peaks at zero and middle time shifts, which are equal to each other and opposite in polarity.

2. The method of claim 1, wherein steps (b) and (c) comprise performing autocorrelation functions of the first and second sequences to generate the first and second sets of prescribed values, respectively.

3. The method of claim 2, wherein lowest out-of-phase coefficients of the autocorrelation function is +4 and −4.

4. The method of claim 1, wherein the communication channel includes a frame having L number of slots, wherein step (d) allows slot-by-slot frame synchronization.

5. The method of claim 1, wherein communication channel includes a plurality of frames, said first and second sequences allowing at least one of frame synchronization and channel estimation.

6. The method of claim 5, wherein each frame has L number of slots, wherein at least one of said first and second sequences allows at least one of slot-by-slot synchronization and double checking of the frame synchronization.

7. The method of claim 5, wherein cross-correlation between first and second sequences used for frame synchronization is zero at zero time shift.

8. The method of claim 5, wherein cross-correlation between the first sequence used for frame synchronization and the second sequence used for channel estimation is zero at all time shifts.

9. The method of claim 5, wherein each frame has L number of slots and each slot has N number of pilot bits such that there are N number of sequences of L-bits in a frame, said first and second sequences being sequences of the N number of sequences.

10. The method of claim 9, wherein there is an even number of sequences used for frame synchronization.

11. The method of claim 5, wherein the first and second sequences allow good cross-correlation and autocorrelation.

12. The method of claim 1, wherein the maximum peak at zero time shift is a first prescribed number*L, and the maximum peak at middle time shift is −(prescribed number*L).

13. The method of claim 9, wherein between adjacent sequences, there are a prescribed number $b_3$ of bit values which are the same and there a prescribed number $b_4$ of bit values which are different such that $b_3$-$b_4$ is zero or close to one.

14. The method of claim 13, wherein the value close to one is +1 or −1.

15. The method of claim 1, wherein said control signals include a third sequence of L-bits and a fourth sequence of L-bits, and further comprising:

generating a third set of prescribed values based on the third sequence, which has a third prescribed relationship with the third set of prescribed values; and generating a fourth set of prescribed values based on the fourth sequence, which has a fourth prescribed relationship with the fourth set of prescribed values, wherein the combining step comprises combining the first, second, third and fourth sets of prescribed values.

16. A method of eliminating sidelobes in a communication channel between a base station and a mobile station, comprising:

(a) generating control signals and data signals within the communication channel, said control signals having a first sequence of L-bits and a second sequence of L-bits;

(b) generating a first set of prescribed values based on the first sequence, which has a first prescribed relationship with the first set of prescribed values;

(c) generating a second set of prescribed values based on the second sequence, which has a second prescribed relationship with the second set of prescribed values; and (d) combining the first and second sets of prescribed values, wherein one of the first and second sets comprises a first sub-set of prescribed values and a second sub-set of prescribed values, wherein said first and second sub-sets are complements of each other.

17. The method of claim 9, wherein the sequences used for frame synchronization are members of a family of i sequences.

18. The method of claim 17, wherein i=8, L=16 and N=4 to 16, each frame having a period of 10 ms and each slot having a period of 0.625 ms.

19. The method of claim 1, wherein step (d) comprises adding the first and second set of prescribed values.

20. A method of reducing sidelobes for frame synchronization, comprising:

generating a plurality of frame synchronization words, each frame synchronization word having a plurality of bits;

performing autocorrelation functions on a pair of frame synchronization words to generate a pair of prescribed value sets; and combining the pair of prescribed value sets such that two peak values equal in magnitude and opposite in polarity are achieved at zero and middle time shifts.

21. A correlator circuit for at least one of a user equipment and a base station, comprising:

a plurality of latch circuits, each latch circuit latching a word formed by a pilot bit from a plurality of slots;

a plurality of correlators, each correlator coupled to a corresponding latch circuit and correlating the word to a set of prescribed values; and a combiner that combines the set from each correlator such that maximum peak values of equal in magnitude and opposite in polarity are formed at zero and middle time shifts.

22. The correlator circuit of claim 21, further comprising a plurality of buffers, each buffer coupled to a corresponding correlator to store the set of prescribed values.

23. A communication device comprising:

means for transmitting at least one of data and control information;

means for receiving at least one of data and control information, wherein said receiving means includes:

a plurality of latch circuits, each latch circuit latching a word formed by a pilot bit from a plurality of slots;

a plurality of correlators, each correlator coupled to a corresponding latch circuit and correlating the word to a set of prescribed values;

a plurality of buffers, each buffer coupled to a corresponding correlator to store the set of prescribed values; and a combiner that combines the set from each buffer such that maximum peaks of equal in magnitude and opposite in polarity are formed at zero and middle time shifts.

24. A set of pilot sequences for at least one of radio frame synchronization and channel estimation of a communication system, wherein each pilot sequence of said set of pilot sequences have maximum autocorrelation value corresponding to their length at a matched point of the correlation period and have minimum autocorrelation value having polarity opposite to said maximum autocorrelation value at the half length delay point and have insignificant autocorrelation values at the other points excluding the matched and the half length delay points, wherein the set of pilot sequences is used in the communication system.

25. The set of pilot sequences of claim 24, wherein a number of zero's and a number of one's in each pilot sequence is the same.

26. The set of pilot sequences of claim 24, wherein a second half of each pilot sequence is made by shifting the first half of the pilot sequence by a certain bit length and by inverting the shifted first half of the pilot sequence.

27. The set of pilot sequences of claim 25, wherein each code sequence comprises 16 bits.

28. The set of pilot sequences of claim 26, wherein the value of shifting is zero.

29. A method for at least one of radio frame synchronization and channel estimation of a communication system comprising:

receiving control signals and data signals from the communication channel, said control signals having a code sequence of L-bits;

comparing said code sequence with a reference sequence; and confining at least one of radio frame synchronization and channel estimation, wherein the code sequence has a maximum autocorrelation value corresponding to its length at a matched point of the correlation period and has minimum autocorrelation value having polarity opposite to said maximum autocorrelation values at the other points excluding the matched and the half length delay points.

30. The method of claim 29, wherein a number of zero's and a number of one's in each code sequence is the same.

31. The method of claim 29, wherein a second half of each code sequence is made by shifting the first half of the code sequence by a certain bit length and by inverting the shifted first half of the code sequence.

32. The method of claim 30, wherein said each code sequence comprises 16 bits.

33. The method of claim 31, wherein a value of shifting is zero.

* * * * *